US011479122B2

(12) United States Patent
Besard et al.

(10) Patent No.: US 11,479,122 B2
(45) Date of Patent: Oct. 25, 2022

(54) ENERGY TRANSMITTER AND RECEIVER MODULE

(71) Applicant: IN2POWER NV, Evergem (BE)

(72) Inventors: Peter Besard, Knokke (BE); John De Clercq, Oordegem (BE)

(73) Assignee: IN2POWER NV, Evergem (BE)

( * ) Notice: Subject to any disclaimer, the term of this patent is extended or adjusted under 35 U.S.C. 154(b) by 118 days.

(21) Appl. No.: 16/340,884

(22) PCT Filed: Oct. 10, 2017

(86) PCT No.: PCT/EP2017/075869
§ 371 (c)(1),
(2) Date: Apr. 10, 2019

(87) PCT Pub. No.: WO2018/069356
PCT Pub. Date: Apr. 19, 2018

(65) Prior Publication Data
US 2019/0232808 A1    Aug. 1, 2019

(30) Foreign Application Priority Data

Oct. 10, 2016   (EP) ..................................... 16193173
Oct. 10, 2016   (EP) ..................................... 16193174

(51) Int. Cl.
*B60L 3/04*      (2006.01)
*B60L 53/65*     (2019.01)
(Continued)

(52) U.S. Cl.
CPC ............... *B60L 3/04* (2013.01); *B60L 53/122* (2019.02); *B60L 53/126* (2019.02); *B60L 53/65* (2019.02);
(Continued)

(58) Field of Classification Search
CPC ........ B60L 3/04; B60L 53/122; B60L 53/126; B60L 53/65; B60L 2200/44;
(Continued)

(56) References Cited

U.S. PATENT DOCUMENTS

| 5,237,492 A | 8/1993 | King | |
|---|---|---|---|
| 2009/0147423 A1* | 6/2009 | Mulligan | H02J 1/02 361/91.1 |

(Continued)

FOREIGN PATENT DOCUMENTS

KR    20120135885 A  * 12/2012    ............. H02J 50/90

OTHER PUBLICATIONS

Machine translation of KR20120135885A. (Year: 2022).*
(Continued)

*Primary Examiner* — David V Henze-Gongola
(74) *Attorney, Agent, or Firm* — Christopher M. Scherer; DeWitt LLP

(57) ABSTRACT

The current invention concerns a method for wireless power transfer from a charging station to an energy storage element of an AGV, or on an AGV. Furthermore, it provides a charging station, as well as a wireless energy receiving system for receiving energy from a charging station and providing said received energy to an energy storage element of an AGV, or on an AGV, and furthermore a system for
(Continued)

wireless power transfer incorporating one or more charging stations and a plurality of said wireless energy receiving systems.

15 Claims, 16 Drawing Sheets

(51) Int. Cl.
  *B60L 53/122* (2019.01)
  *B60L 53/126* (2019.01)

(52) U.S. Cl.
  CPC ............ *B60L 2200/44* (2013.01); *Y02P 90/60* (2015.11); *Y02T 10/70* (2013.01); *Y02T 10/7072* (2013.01); *Y02T 90/12* (2013.01); *Y02T 90/14* (2013.01); *Y02T 90/16* (2013.01); *Y02T 90/167* (2013.01); *Y04S 30/14* (2013.01)

(58) Field of Classification Search
  CPC ....... Y02T 90/167; Y02T 90/12; Y02T 90/60; Y02T 90/14; Y02T 90/169; Y04S 30/14; Y02P 90/60
  See application file for complete search history.

(56) References Cited

U.S. PATENT DOCUMENTS

| | | | |
|---|---|---|---|
| 2011/0187321 A1* | 8/2011 | Hirayama | H02J 50/10 320/108 |
| 2011/0248673 A1* | 10/2011 | Aerts | H02J 50/12 320/108 |
| 2012/0306433 A1 | 12/2012 | Kim et al. | |
| 2015/0274023 A1 | 10/2015 | Houivet et al. | |
| 2015/0280455 A1* | 10/2015 | Bosshard | B60L 5/005 307/104 |
| 2016/0043565 A1 | 2/2016 | Asaoka et al. | |
| 2016/0075239 A1 | 3/2016 | Briz et al. | |
| 2016/0176302 A1 | 6/2016 | Boyer et al. | |
| 2016/0181820 A1* | 6/2016 | Kautz | H02J 7/025 307/104 |
| 2017/0033586 A1* | 2/2017 | Weidner | H02M 3/337 |

OTHER PUBLICATIONS

International Search Report and Written Opinion for PCT/EP2017/075869 dated Jan. 25, 2018.

Office Action for application No. EP 17793579.8-1205 dated Feb. 11, 2021, from European Patent Office.

* cited by examiner

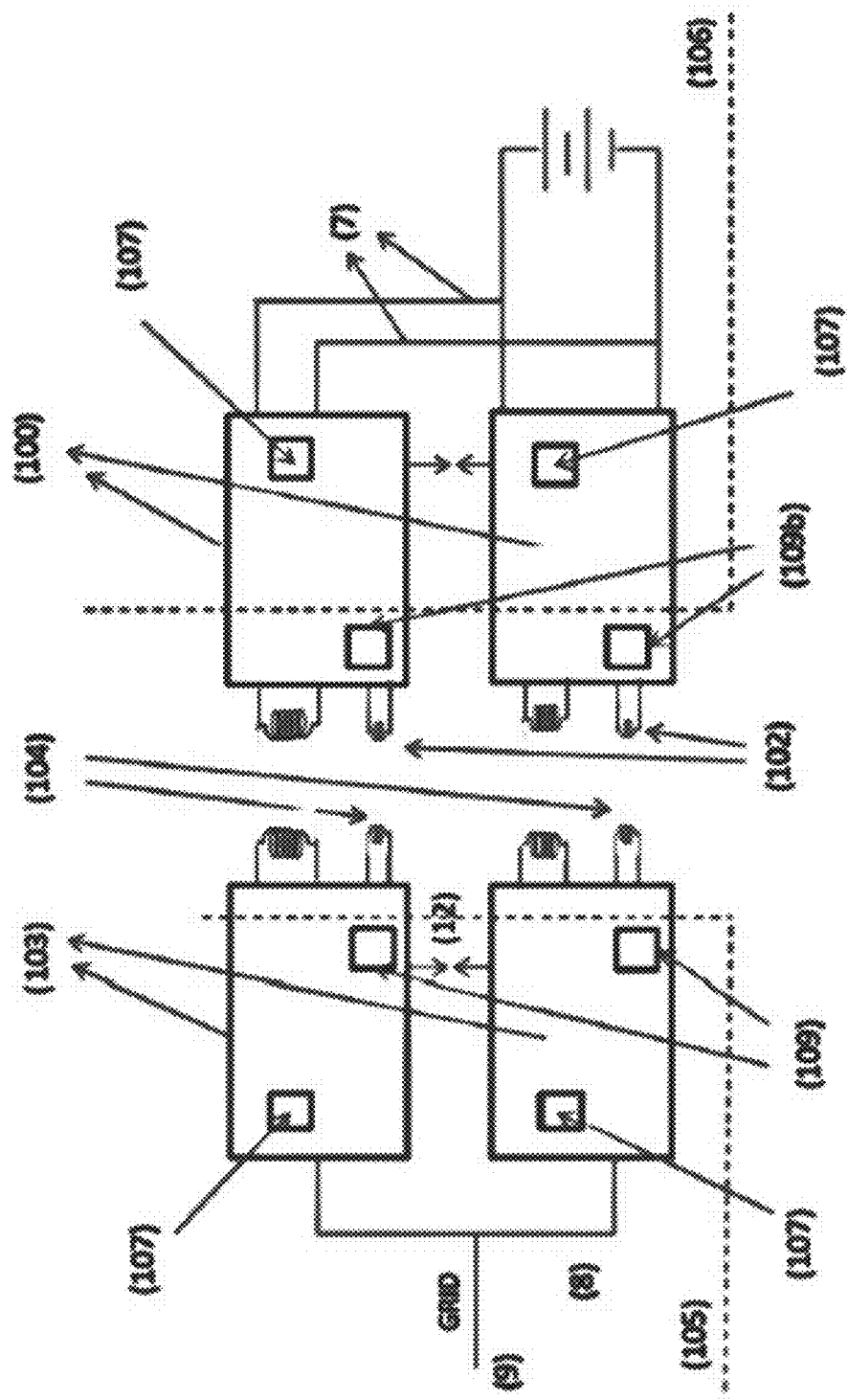

ENERGY TRANSMITTER AND RECEIVER MODULE

CROSS-REFERENCE TO RELATED APPLICATIONS

The present application is the U.S. national stage application of International Application No. PCT/EP2017/075869, filed Oct. 10, 2017, which international application was published on Apr. 19, 2018, as International Publication No. WO2018/069356. The International Application claims priority to European Patent Application No. 16193174.6, filed Oct. 10, 2016, and European Patent Application No. 16193173.8, filed Oct. 10, 2016, the contents of which are incorporated herein by reference in their entireties.

TECHNICAL FIELD

The invention pertains to the technical field of wireless charging stations for batteries of vehicles for industrial environments, industrial vehicles such as AGVs (automated guided vehicles). The invention specifically provides an improved modular system for wireless power transfer for these industrial vehicles, maximizing efficiency of energy transfer and reducing necessary charging time by a flexible charging process.

BACKGROUND

Due to the strong increase in use of industrial electric vehicles (and/or hybrid vehicles), for instance AGVs, a necessity has risen for a charging system and method that can rapidly charge a battery or energy storage element (such as supercapacitors and/or ultracapacitors) of said vehicles with more flexibility than the current systems provide. Typically, these systems are limited in several ways. The older generations of energy transfer for instance required a mechanical connection between the charging station and the receiving vehicle. However, this causes a fast degradation of the contact points, both due to mechanical damage (from the contacts and others), as well as pollution of the contact points (for instance due to the environment) which lead to the need of frequent repairs and replacing of components. Furthermore, these mechanical contacts can be dangerous for humans. Contactless charging also makes charging possible in food factories, pharmaceutical and medical factories as an example. This has led to the rise in contactless charging technologies. Many systems are currently on the market for wireless energy transfer, most by electromagnetic induction between a coil on the transmitting end and a coil on the receiving end. However, the applicant observed that the currently provided systems still are not able to provide a flexible and fast wireless charging method, while keeping certain safety precautions such as low voltages and/or currents at the charging station.

Disclosed in the document US 2011/0285349 is a charging system focusing on an optimal alignment of the wireless charging station and the energy receiving system of the vehicle. As this can only optimize a power transfer, it has little to no effect on actually increasing the capacity for power transfer as is desired.

Other systems proposed in the prior art would simply increase the voltage and current on the transmitting side in order to increase the amount of energy that is transferred. However, this can create unsafe working conditions due to danger of accidents when dealing with such currents and voltages, and are extremely demanding on the systems handling these, requiring both a more expensive system on both ends (transmitter side and receiver side), and a far more frequent repair and replacement downtime (and cost). As such, these systems are to be dismissed as an inefficient and brute force solution to the problem. An example of such a system can for instance be found in the document US 2013/0188397.

There remains a need in the art for an improved wireless charging system and accompanying method that enables the fast charging of vehicles with variable energy receiving system configurations.

SUMMARY OF THE INVENTION

The present invention relates to a charging equipment comprising an energy transmitter module and an energy receiver module. Embodiments of the present invention are described further below.

The present invention provides a method for wireless energy transfer from a wireless energy transfer station to an automated guided vehicle (AGV), whereby said wireless energy transfer station comprises two or more energy transmitting circuits, each preferably comprising a coil and a resonant capacitor, and whereby said AGV comprises at least one energy storage element, preferably a battery, and two or more energy receiving circuits, each preferably comprising a coil and a resonant capacitor, configured for wirelessly receiving energy from one of said energy transmitting circuits and configured for charging said at least one energy storage element with said wirelessly received energy, comprising the following steps:

a. aligning two or more of said energy receiving circuits with an equal number of said energy transmitting circuits for inductive coupling, whereby said aligning is verified by a near-field communication (NF), and optionally by a second wireless communication, between the AGV and the wireless energy transfer station, preferably by transmitting an identifier code of the AGV to the wireless energy transfer station;

b. inductively coupling said aligned energy transmitting circuits with said energy receiving circuits, wherein at least two of said energy transmitting circuits are inductively coupled with at least two of said energy receiving circuits in a one-on-one relation;

c. transferring energy from said inductively coupled energy transmitting circuits to said inductively coupled energy receiving circuits by inducing a current in said energy receiving circuits;

d. charging said at least one energy storage element with the transferred energy, wherein the induced current of each of said energy receiving circuits is provided in parallel with respect to each other to said at least one energy storage element.

In a preferred embodiment, each of the energy transmitting circuits is separately controlled by a transmitting controller, whereby each of said transmitting controllers is configured to control the step c of transferring energy from an energy transmitting circuit to an energy receiving circuit.

In an embodiment, a number (N) of two or more of said energy receiving circuits are provided and a number (M) of said energy transmitting circuits for inductive coupling are provided, whereby the number (N) of energy receiving circuits is not equal to the number (M) of energy transmitting circuits for inductive coupling (N≠M), and the method comprises the step of pairing two or more of said energy receiving circuits with an equal number of said energy transmitting circuits for inductive coupling, preferably said pairing performed on information transmitted between the energy receiving circuits and the energy transmitting circuits, more preferably said information comprising any or any combination, and preferably all, of the following data:

- an indication that an energy receiving circuit is present;
- an indication that an energy receiving circuit is aligned with an energy transmitting circuit, and preferably also an indication of the degree of alignment—note that this signifies an orientation alignment, with an angulation between the receiving circuit and the transmitting circuit (can for instance be achieved via XYZ and rotational coordinates of the transmitting circuit or the energy transfer station which can then be compared to the coordinates of the AGV to determine the angulation;
- an indication of a distance between an energy receiving circuit and an energy transmitting circuit;
- an identifier code of the AGV.

Hereby, in a further embodiment, the number (N) of energy receiving circuits can be larger than the number (M) of energy transmitting circuits for inductive coupling (N>M), whereby said step of pairing comprises selecting a set of M energy receiving circuits from said number (N) of energy receiving circuits for pairing with said M energy transmitting circuits, preferably the selection being done taking into account the transmitted information. In an alternative embodiment, the number (M) of energy transmitting circuits can be larger than the number (N) of energy receiving circuits for inductive coupling (M>N), whereby said step of pairing comprises selecting a set of N energy transmitting circuits from said number (M) of energy transmitting circuits for pairing with said N energy receiving circuits, preferably the selection being done taking into account the transmitted information, and preferably the selection being performed through a master-slave configuration of the energy transmitting circuits, and specifically of the transmitting controllers thereof. In the latter configuration, preferably a master energy transmitting circuit is paired with an energy receiving circuit and energy is transmitted therebetween, whereby a slave energy transmitting circuit is configured to take over transmission of energy in case of failure of transmission of energy by the master energy transmitting circuit. The same master-slave configuration preferably is the case with the receiving controllers as well. By providing a master controller (for the transmitting controllers and/or the receiving controllers), this allows an enhanced performance, as the master transmitting controller will, based on the desired power and/or current and/or voltage of the AGV, instruct or direct the slave transmitting controllers (and of course itself included) to provide a certain part of the current and/or power. This can also allow the energy transfer station to vary the output current and/or power, dependent on the requirements of the AGV to be charged.

In a preferred embodiment, at least one and preferably each of the energy transmitting circuits is driven by two half bridges.

In a further preferred embodiment, the wireless energy transfer station and the AGV are adapted for wireless communication, preferably via near-field (NF) and optionally via a second communication bus, said method further comprising the following steps:

a. establishing a data connection via NF between the wireless energy transfer station and the AGV;
b. exchanging AGV information from the AGV to the wireless energy transfer station, at least comprising the number of energy receiving circuits;
c. inductively coupling a number of energy transferring circuits with said energy receiving circuits, wherein said number of energy transferring circuits are inductively coupled with the energy receiving circuits in a one-on-one relation;
d. transferring energy from said inductively coupled energy transmitting circuits to said inductively coupled energy receiving circuits by inducing a current in said energy receiving circuits;

whereby a number of energy transmitting circuits are inductively coupled for transferring energy to the inductively coupled energy receiving circuits, said number being determined based on the AGV information, preferably whereby the AGV information comprises a receiving circuit configuration and whereby the energy transmitting circuits to be inductively coupled for energy transfer to the energy receiving circuits are designated in view of said receiving circuit configuration.

In a second aspect, the present invention provides a wireless energy transfer station for wireless energy transfer from the wireless energy transfer station to automated guided vehicles (AGVs), whereby said AGVs comprise one or more energy storage elements and two or more energy receiving circuits, preferably comprising a coil and a resonant capacitor, configured for receiving energy through wireless energy transfer and configured for charging said energy storage element with said received energy, whereby the wireless energy transfer station comprises:

a. two or more energy transmitting circuits, preferably comprising a coil and a resonant capacitor, said energy transmitting circuits being configured for inductively coupling with one of the energy receiving circuits of the AGV in a one-on-one relation, and transmitting energy to said inductively coupled energy receiving circuit through wireless energy transfer, whereby said energy transmitting circuits are set-up in a physical configuration with respect to each other to match a physical configuration of the energy receiving circuits of the AGV; and
b. two or more transmitting controllers, each associated to one of the energy transmitting circuits, configured to determine at least the number of energy receiving circuits comprised in the AGV, and each adapted to control the associated energy transmitting circuit;

whereby the associated transmitting controllers are configured to separately drive the one or more energy transmitting circuits that are inductively coupled, for generating currents through the energy transmitting circuit, which currents are adapted to induce a time-varying electromagnetic field which generates the induced currents in the energy receiving circuits.

In a third aspect, the present invention provides a wireless energy receiving system for charging at least one energy storage element, preferably a battery, of an AGV, whereby said wireless energy charging system is comprised in the AGV and electrically connected to said at least one energy storage element, the wireless energy receiving system comprising:

a. two or more energy receiving circuits, preferably comprising a coil and a resonant capacitor, each configured inductively coupling with an energy transmitting circuit, preferably comprising a coil and a resonant capacitor, of a wireless energy transfer station in a one-on-one relation, and configured for receiving energy through wireless energy transfer from said inductively coupled energy transmitting circuit whereby a current is induced in the energy receiving circuit, and furthermore configured to charge said at least one energy storage element by providing the induced current of each of said energy receiving circuit in parallel to said at least one energy storage element;

b. and preferably one or more receiving controllers, each associated to one of the energy receiving circuits configured to control the energy receiving circuits.

DESCRIPTION OF THE FIGURES

FIG. 18 shows a schematic representation of an embodiment wherein an AGV comprises at least two energy receiving circuits, each with a controller and the energy transfer station comprises at least two energy transmitting circuits, each with a controller.

DETAILED DESCRIPTION OF THE INVENTION

Figure 1:
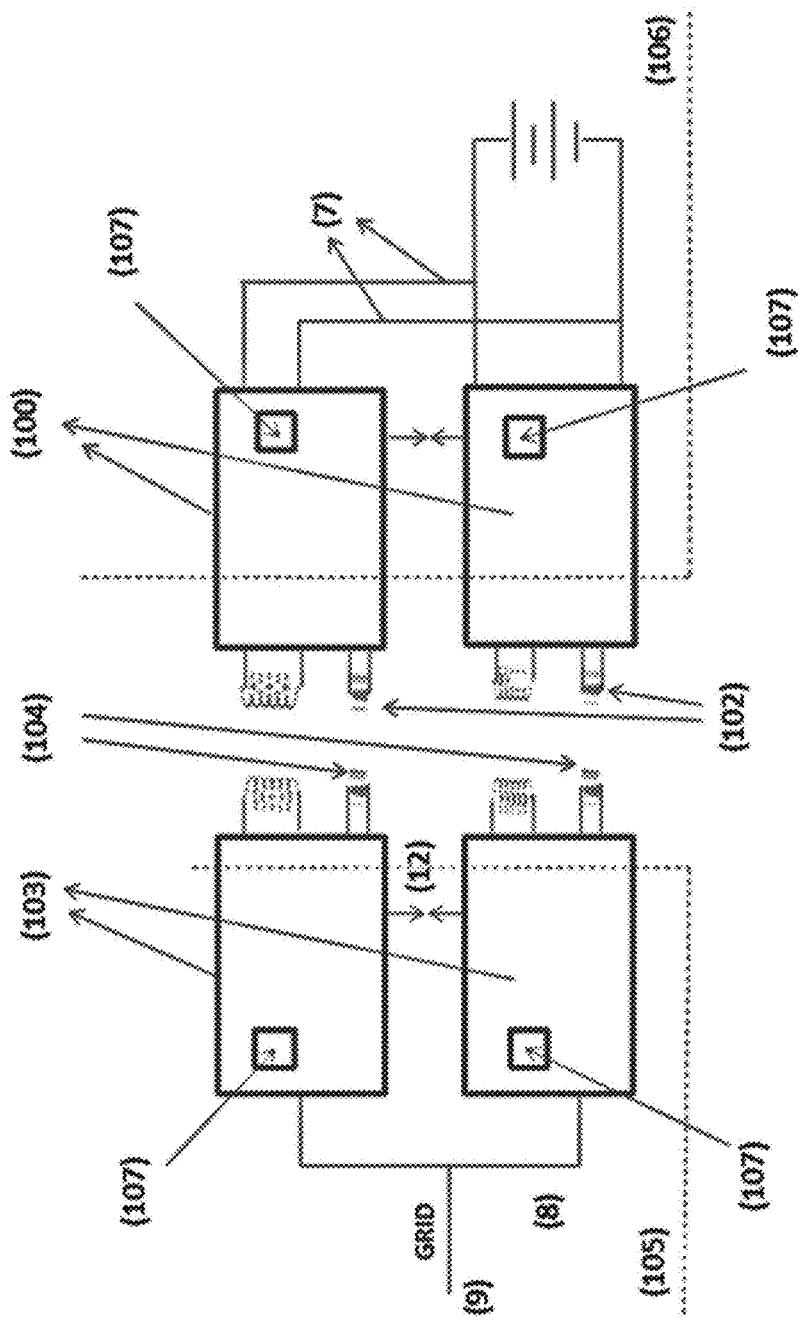
FIG. 1 illustrates a charging equipment comprising an energy transmitter module (100) (TX) and an energy receiver module (101) (RX) according to an embodiment of the invention.
Figure 2:
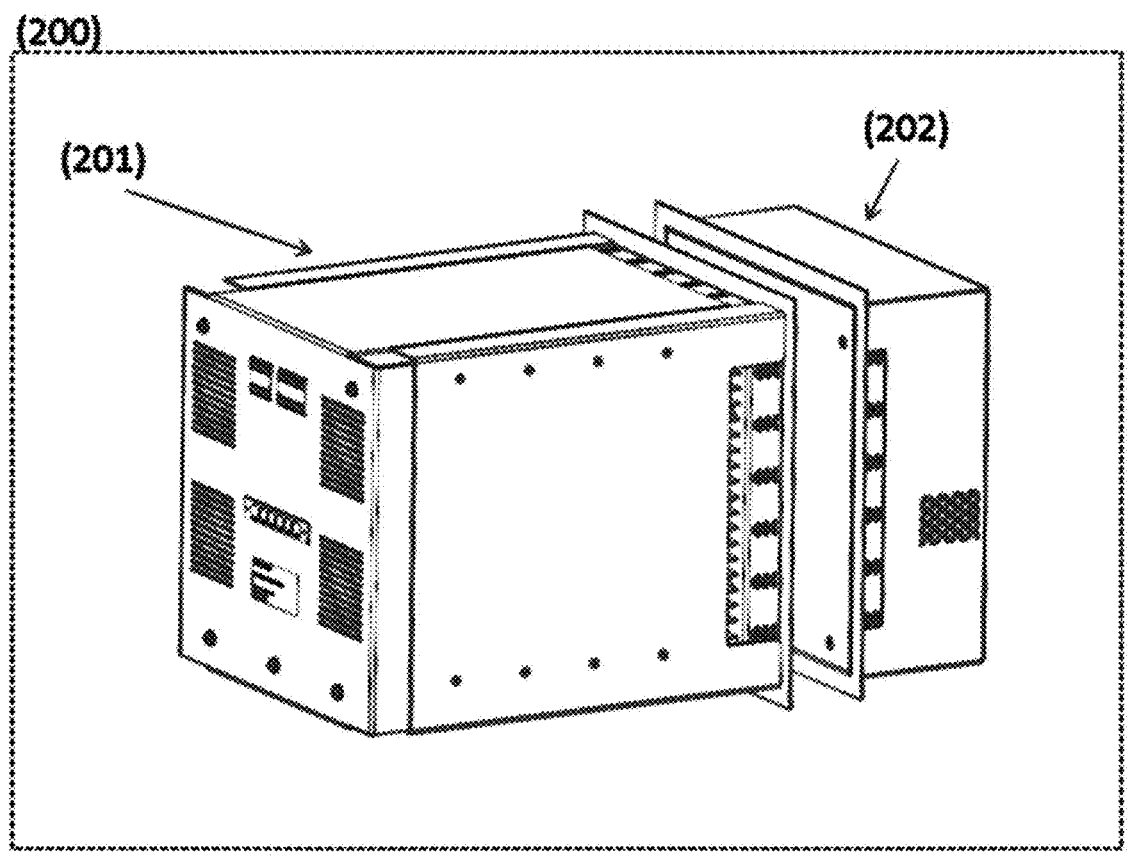
FIG. 2 illustrates an AGV wireless charging system which comprises a TX module (200) which is called the charger module and an RX module (201) which is placed on the AGV according to an embodiment of the invention.
Figure 3:
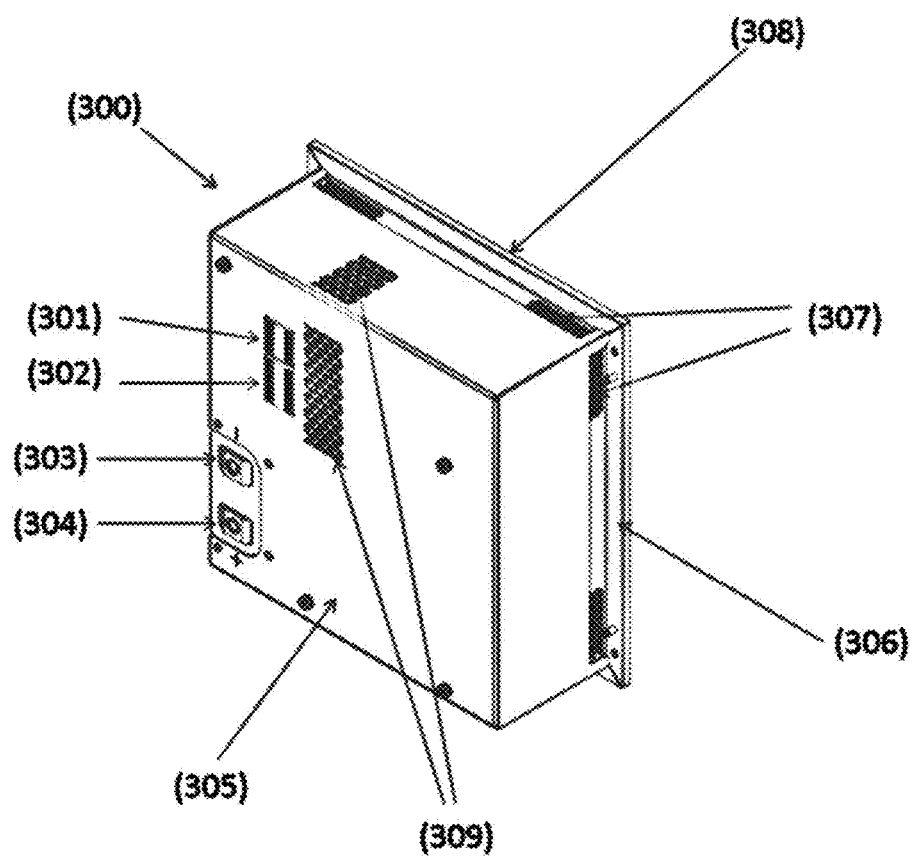
FIG. 3 illustrates the back and the front of an AGV RX receiver (300) module according to an embodiment of the invention.
Figure 3:
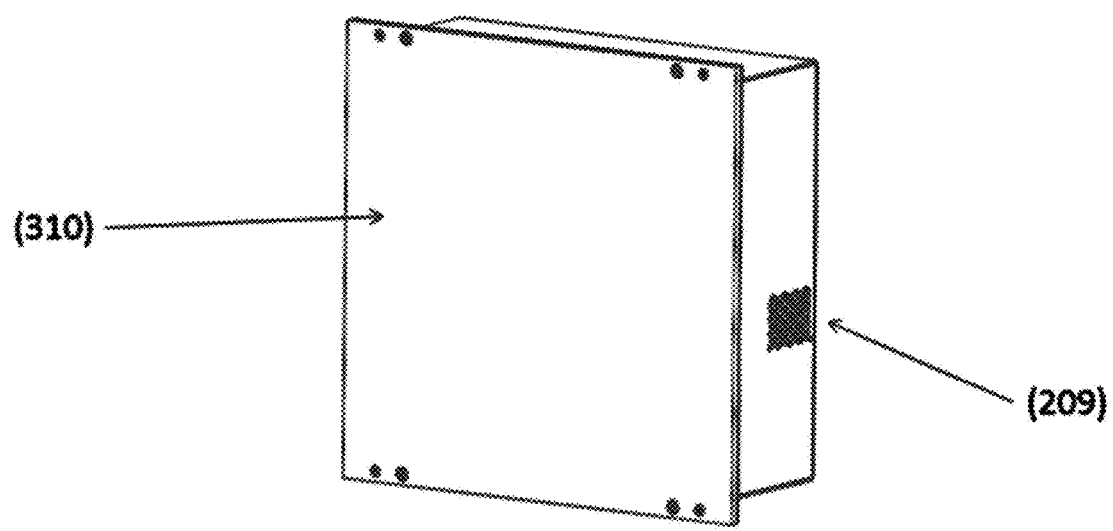
Figure 4:
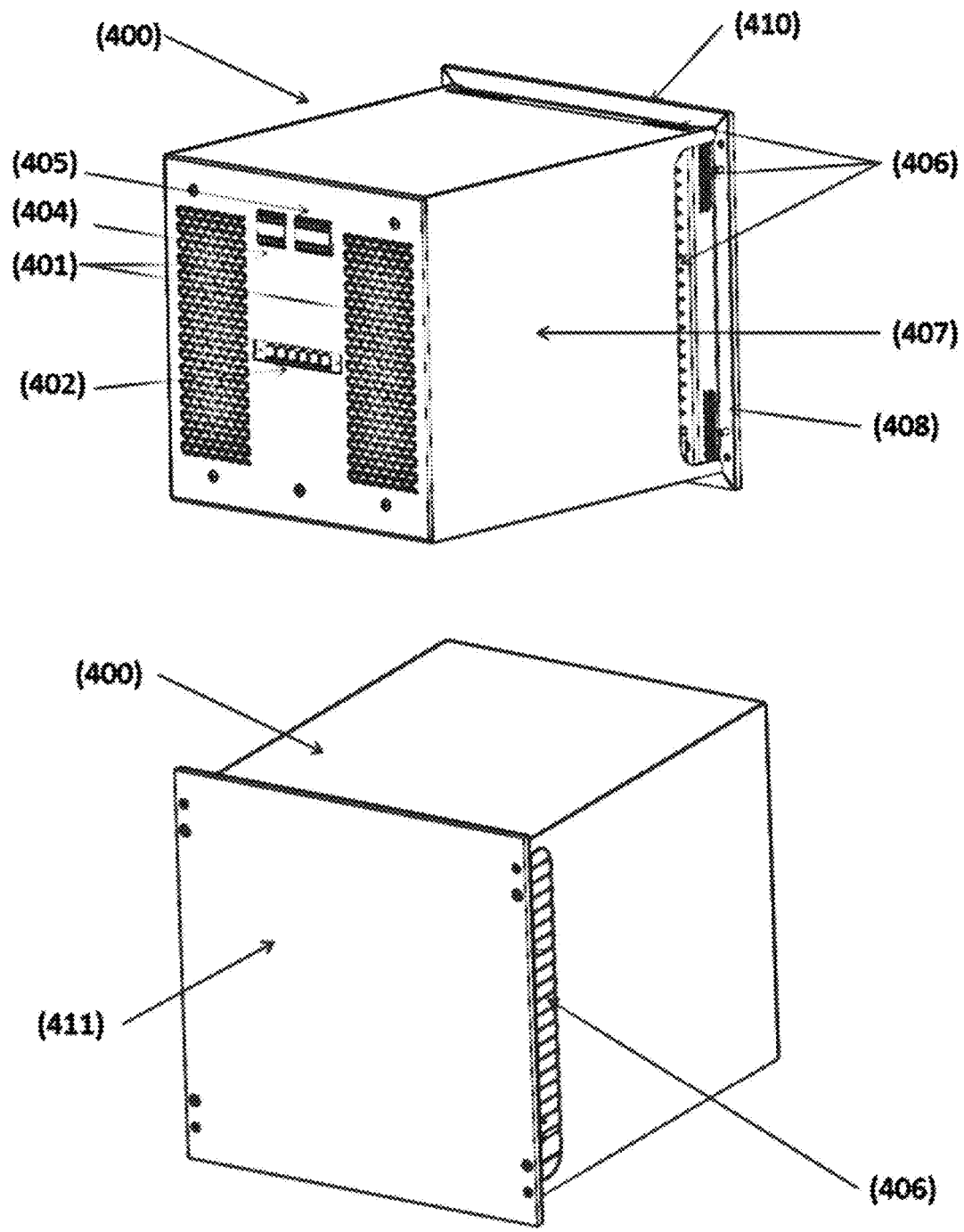
FIG. 4 illustrates the back and the front of a transmitter module (400) according to an embodiment of the invention.
Figure 5:
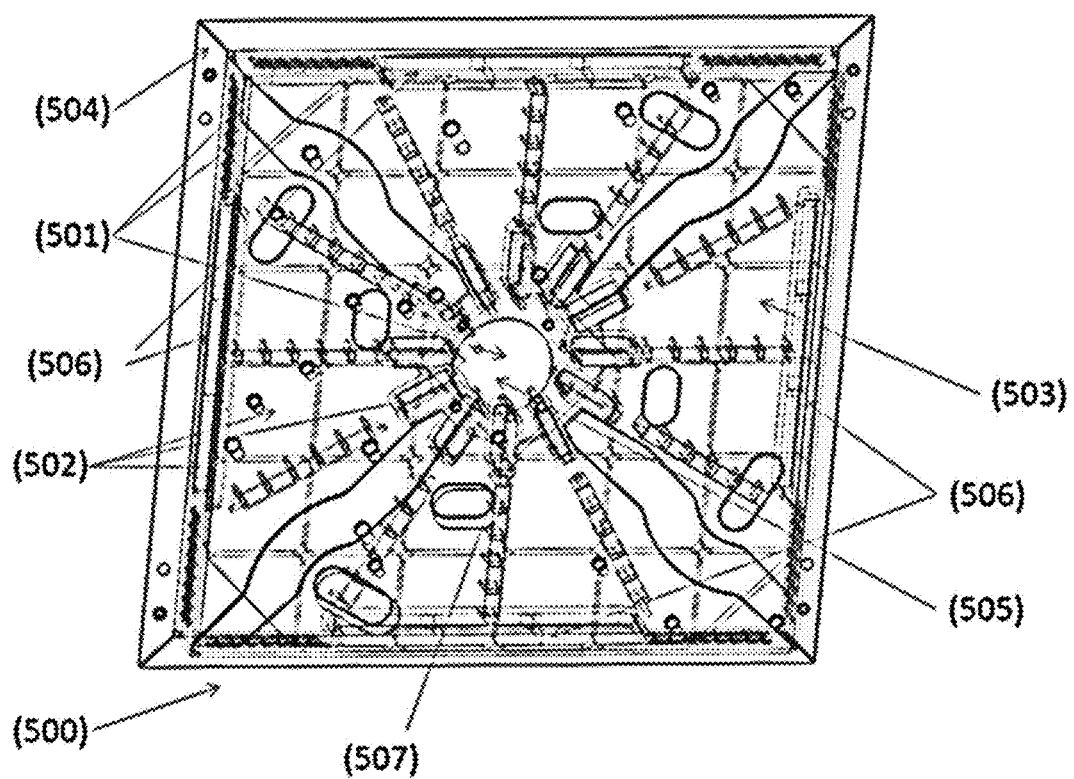
FIG. 5 illustrates a system comprising a primary (TX) coil and a secondary (RX) coil according to an embodiment of the invention.

FIG. 1:

The charging equipment comprises an energy transmitter module (100) (TX) and an energy receiver module (101) (RX).

The TX module (100) is connected to the grid or to a DC link voltage.

The RX module (101) is connected to a battery or super capacitor or alike. Optionally through a electronic converter.

The RX box (101) has a Near Field (NF) transmitter (902) (110) sending an identification from AGV receiver module (101) to charger transmitter module (100) through an NF receiver (1000) (109). This identification might be and serial number, a wireless communication address, . . . . This information is communicated from (110) to (109).

Receiving the magnetic near field on (109) shows that an AGV is present at the charge module and optionally it indicates that the AGV is aligned to the charger.

Optional: In case the NF has a back channel communication too, the data communication can be 2 ways.

After receiving sufficient information from the AGV, the wireless module (107) and (108) try to make connection. After making connection, a communication link is established between the AGV module and its charge module. In that case the NF is not needed any more and power transfer can be initiated.

FIG. 2:

The AGV wireless charging system is built out of a TX module (200) which is called the charger module and a RX module (201) which is placed on the AGV. The primary TX module (200) contains in this case the wireless charging electronics.

In the case presented in this figure, the TX coil is integrated in the wireless power TX module (200), but could be a lose part too, that could e.g. be mounted separately in the charging station or in the floor.

In the case presented in this figure, the RX coil is integrated in the wireless power RX module (201) but could be a loose part too, that could e.g. be mounted separately in the AGV.

FIG. 3:

The AGV RX receiver (300) module consists out of a front cover (310) being plastic to allow the magnetic field to come through. A shield back cover (305) closes the electronics housings and provides electromagnetic shielding. The AGV RX module (300) contains the RX receiver electronics. It has openings for (309) for air inlet and openings (307) for air outlet. The module has a connection for the output minus voltage and a connector (301) for the plus voltage output. Connector (301) allows communication busses (e.g. CAN) to connect to the AGV and to connect to parallel modules. Connector (302) provides user inputs and outputs. The flange (306) allows the RX part (300) to be integrated in an AGV.

FIG. 4:

The transmit module (400) is composed out of the wireless charging electronics and the primary TX coil.

The module has input power connectors (402) that can be fed at 3PH AC voltage or DC voltage.

The module has a input connector (404) providing a connection for a communication bus to the charging station or industrial installation controller or to other modules (400).

The transmitting coil is covered by a plastic front cover (411).

The TX module has air inlet openings (401) and air outlets (406) for cooling purposes.

FIG. 5:

Represents the build-up of the primary (TX) coil and the secondary (RX) coil. We call this the coupler (500) construction.

Figure 12:
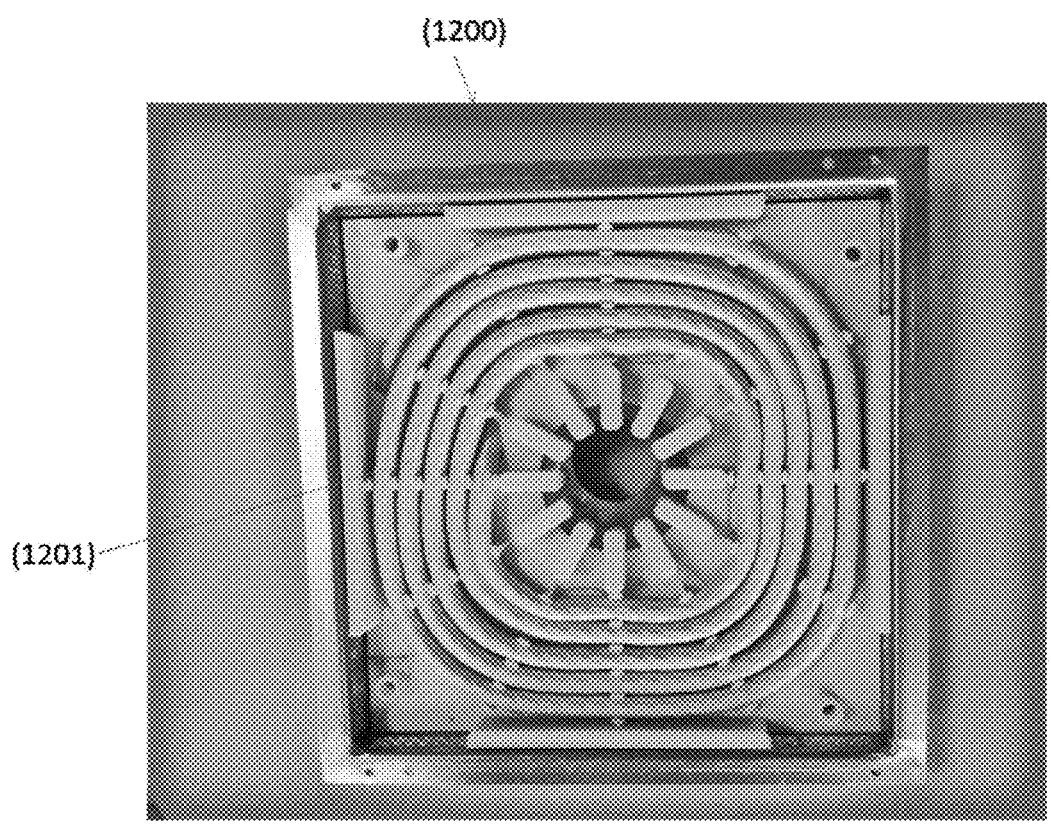

The coupler construction comprises a shielding plate (504) that holds ferrite (502), plastic isolator and wire (FIG. 12) (1200).

TX coil and RX coil can have different ferrite construction, shield construction, plastic construction and different number of windings and different wire.

Four areas (506) of ferrite in the TX coupler ensure that the magnetic field gets toward the four areas of ferrite in the RX coupler to avoid leakage field to the maximum.

Four areas (506) of ferrite in the RX coupler ensure that the magnetic field gets toward the four areas of ferrite in the TX coupler to avoid leakage field to the maximum.

In the middle, multiple ferrites (507) are providing a gateway for the magnetic flux from TX coil to RX coil and from RX to TX.

The metal coil holder (504) holds ferrites (503) that provide a flux path for the magnetic field under the coil. On top of the ferrite (503), (506) and (507), a plastic part provides insulation between the holder (504), ferrite (503, 506 and 507) and the wire (1201).

This plastic part has the following functions:
1. Insulation between wiring/electronics and housing. We assume that the housing of the TX is connected to the earth (PE) and that the housing of the RX module is connected to the BATTERY (102) GND or 0V or floating or to the casing (chassis) of the AGV. The plastic takes care about creepage distance and clearance according to the requirement of the applicable standards.
2. The plastic has also the function of as a coil former to hold the windings.
3. The plastic can be made out of multiple parts (4 in our case) to have smaller mould. Optional overlap can take care of electrical creepage and clearance.
4. The plastic can have break out areas to allow the wire to escape to the electronics that are mounted at the back.
5. The plastic can provide insulation in the openings that allow the wire go to the back.
6. The plastic can support the front cover (310) and (411).
7. The plastic can be made out of a material that can resist to higher temperatures.

The ferrite at the sides (506) has similar height as the flange (504) so that the metal is saved from the major part of the magnetic field. If the ferrite would not be there or be lower that the flange, the eddy current losses in the flange would be high. So it has been found that at least equal ferrite height is required.

FIG. 7:

The RX module (201) contains the RX (701) coil and the RX electronics (702) (703), (704), (705) and (706) and optionally (711) (712) OR (709) and (710).

The RX module also contains a controller.

FIG. 8:

The TX transmitter module (200) (400) contains electronics to drive the primary TX coil. (804) that is held into the primary coupler holder (500). This electronics receive a + (808) and − (809) from the input connector (402) or from and internal grid rectifier. (808) and (809) form a DC link that holds two halve bridges (805) and (806) forming together a full bridge inverter. The halve bridge point (802) is connected to an impedance Z towards the first TX coil (804) end. The other half bridge point (803) is connected to an impedance Z towards the second TX coil (804) end.

Figure 6:
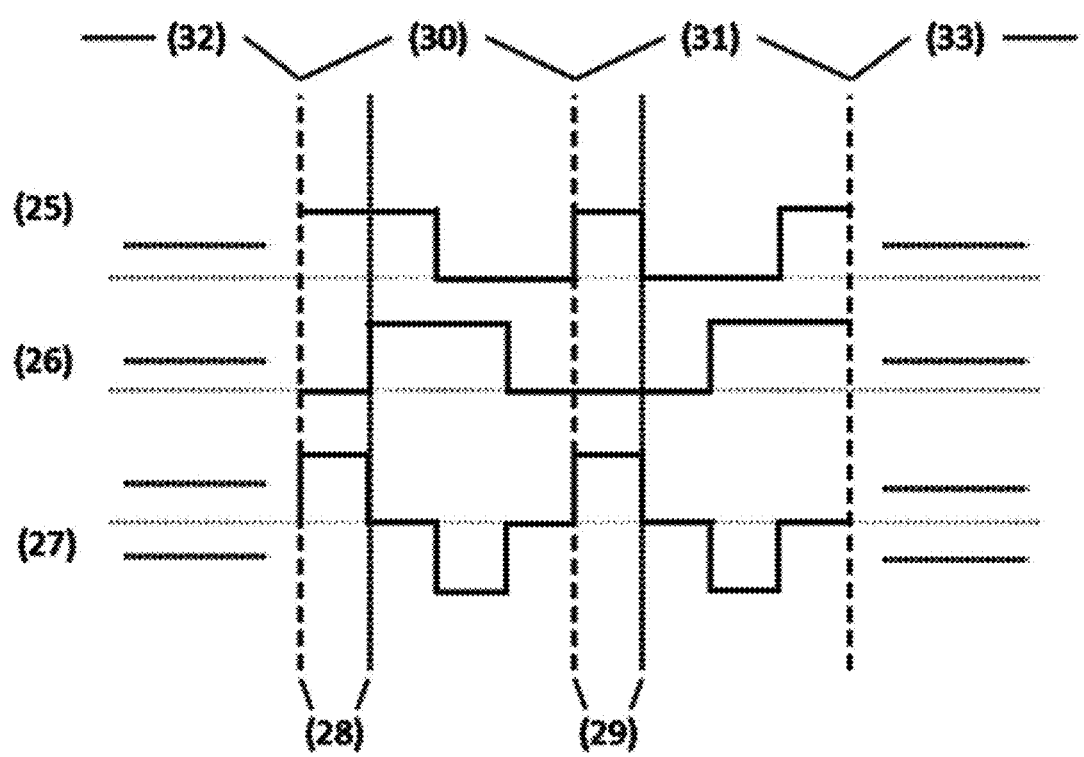
FIGS. 6, 11 and 12 illustrate further embodiments of the invention.
Figure 7:
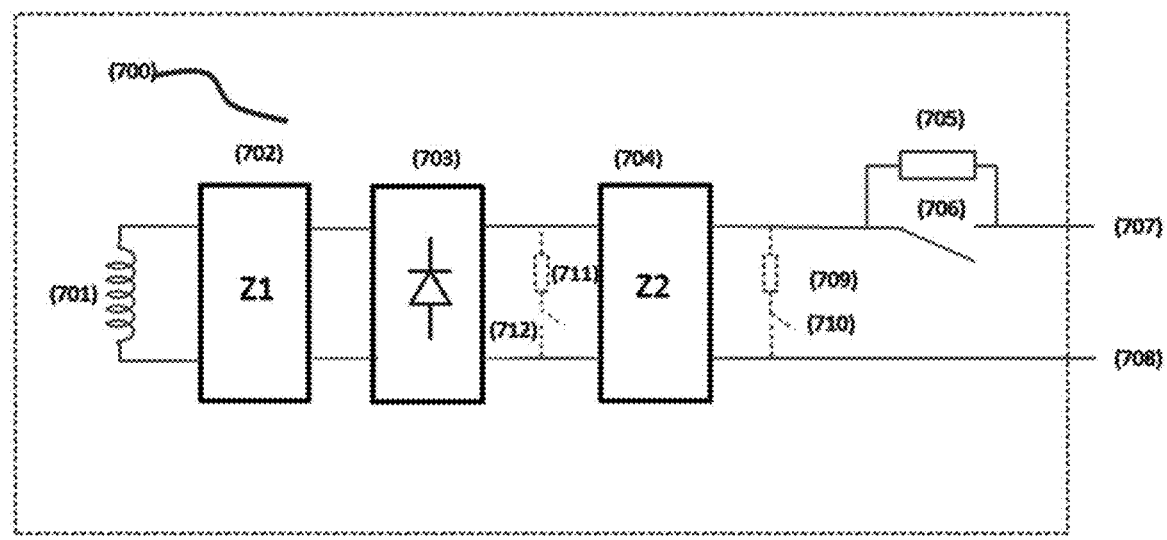
FIG. 7 illustrates an RX module according to an embodiment of the invention.
Figure 8:
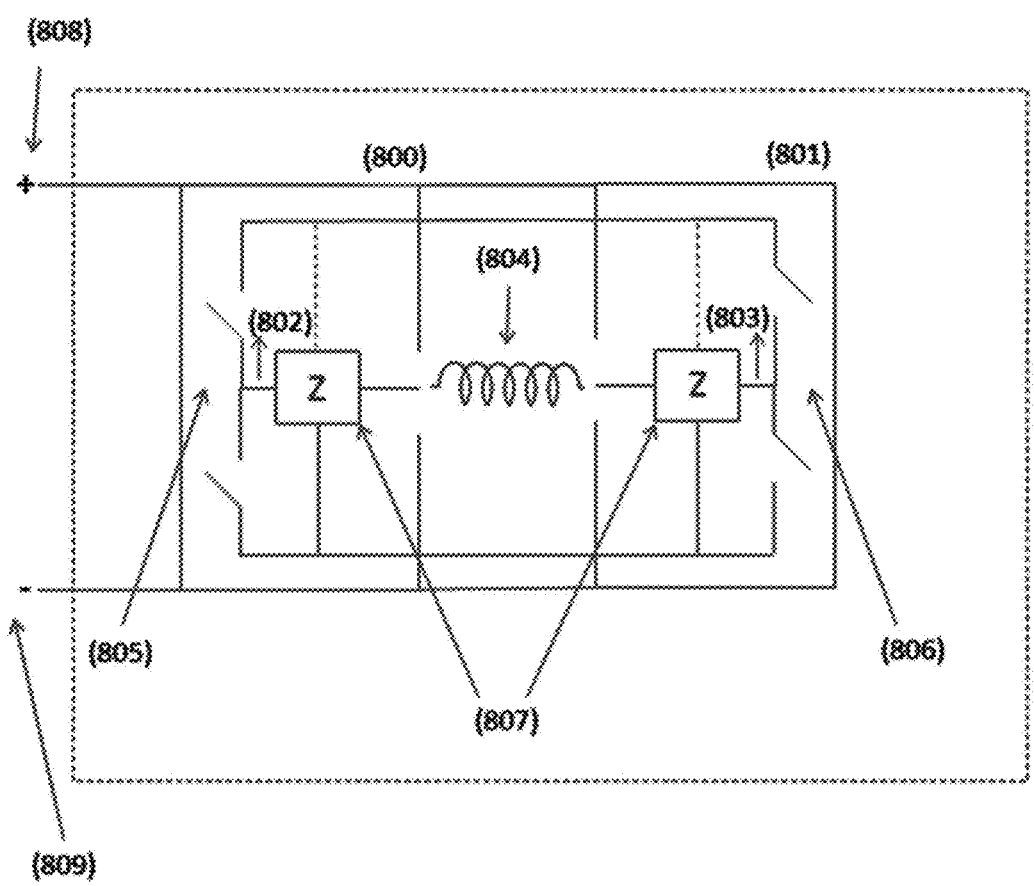
FIG. 8 illustrates a TX transmitter module according to an embodiment of the invention.
Figure 9:
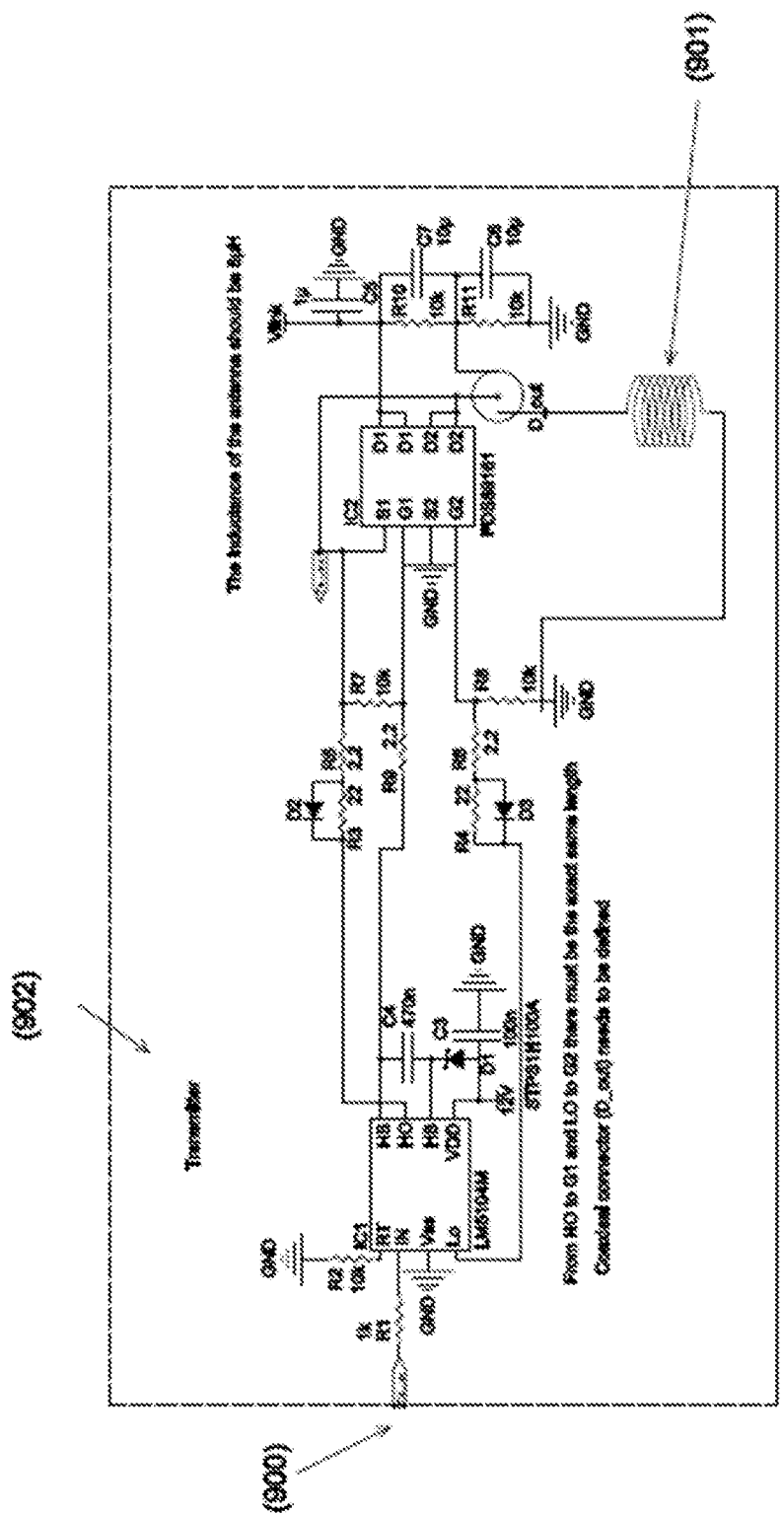
FIG. 9 illustrates a near-field antenna according to an embodiment of the invention.
Figure 10:
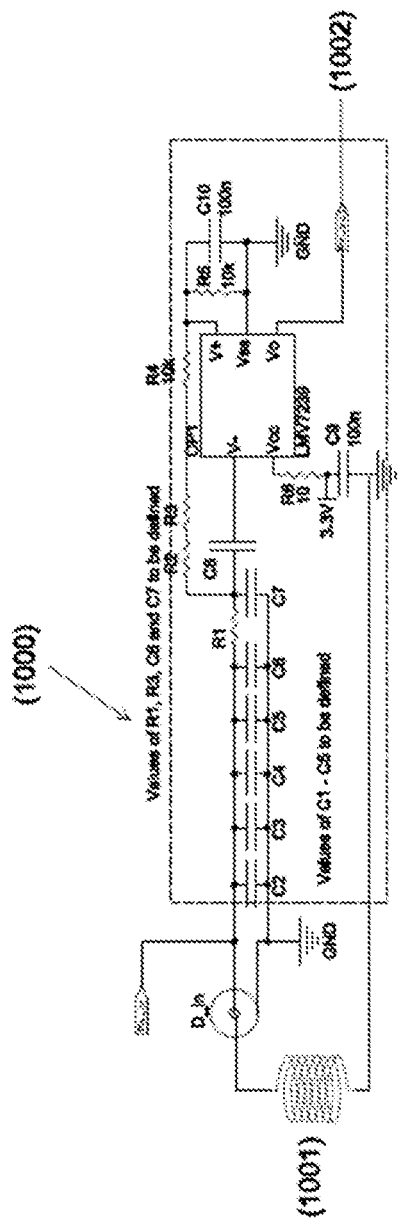
FIG. 10 illustrates a near-field (NF) receiver circuit according to an embodiment of the invention.
Figure 11:
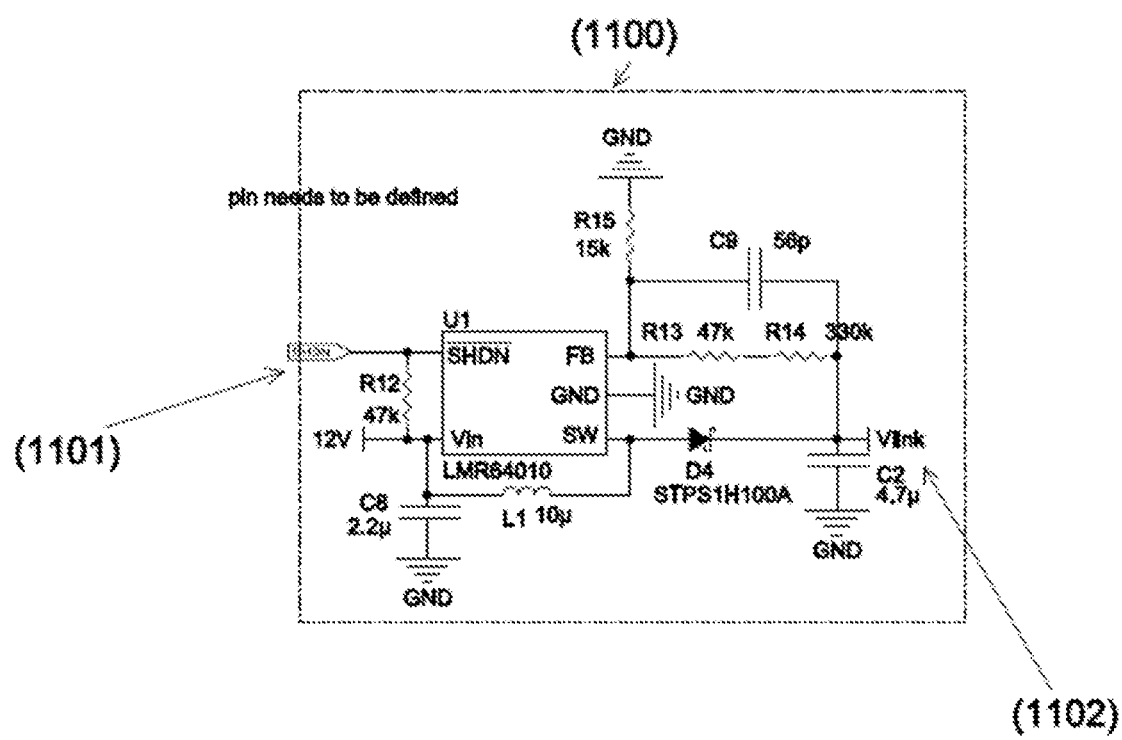

The full bridge (805)-(806) will be switched as shown in FIG. 6, where (25) shows the voltage on (802) and (26) shows the voltage on (803). Each period (30), (31), . . . represents the switching frequency. By keeping the switching pattern and in (25) and (26), the coil sees the differential voltage (27). Using the switching pattern (25) and (26), the switching losses can be equalised over both half bridges (802) and (803).

FIG. 9:

At position (501) a near field antenna is installed. In the RX the NF coil will act as a transmitter. In the TX the NF coil will act as a receiver.

The transmitter NF coil (901) will be driven by an electronic circuit (902) with a frequency and on/off modulation or will be driven with frequencies and FSK modulation. The modulator circuit can be connected to the driver circuit (902) through signal (900).

In the case the coil needs a higher voltage (1102) than available, the circuit (902) can be driven by a circuit (1100) that acts as a boost converter boosting an available voltage to a suitable voltage.

A shut-down signal (1101) can be made available to shut off the NF transmitter (902).

FIG. 10:

Contains an NF receiver circuit. The NF coil (1001) that is placed at position (505) receives the NF magnetic field signal from the transmitter coil (901) and filters this coil with a band pass filter. A comparator OP1 detects the signal and demodulates the signal to the signal (9002).

The near field communication and coil setup has the following functions:
  Detecting alignment of (200) and (201) so that a decision can be made that wireless power transmission is possible.
  Detecting the distance between (200) and (201) so that a decision can be made that wireless power transmission is possible and safe.
  Sending identification data from AGV to Charger. In case a back channel is provided: information can be sent in the direction Charger to AGV.

The concept is that way that the when the AGV arrives at the charging station, it sends out the identification information including its wireless address. Then the charger communicates further with the AGV.

This wireless communication includes:
  Further exchange of information regarding the type of AGV receiver module and Charger transmitter module.
  Exchanging fault conditions in the electronics in AGV and Charger.
  Control loop information: de AGV RX module sends the output current information and the setpoint of the output current information to the Charger TX module. The charger TX module will then drive the full bridge (800) that way that the AGV module output current approaches the AGV module output set current.

The present invention concerns a method and systems for wireless power transfer to electric vehicles, preferably AGVs.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

As used herein, the following terms have the following meanings:

"A", "an", and "the" as used herein refers to both singular and plural referents unless the context clearly dictates otherwise. By way of example, "a compartment" refers to one or more than one compartment.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The term "energy storage element" refers generally to any element or component capable of rechargeable energy storage, thus comprising batteries but also representing alternatives, for instance supercapacitors. It furthermore is in not necessarily reduced to a single battery or energy storage element, but could also describe a battery pack which combines several separate batteries into a unit that allows to install said battery pack more easily, instead of installing the batteries separately. Furthermore, such a battery pack can be provided with extra features, for instance allowing data transfer (in one or both ways) between the battery pack and other systems, preferably the power transfer system of the invention.

The term "wireless energy transfer station" or "charging station" refers to a system designed for inductively charging an energy storage element (or several) of an AGV. This can be achieved by a so-called charging post, where the separate energy transmitting circuits are stacked in a vertical plane, or a charging mat or floor, where the energy transmitting circuits are provided in a horizontal plane.

The term "energy transmitting circuit" refers to a circuit designed to generate a magnetic field for power transfer with a coupling element, preferably with a coil.

The term "energy receiving circuit" refers to a circuit designed to inductively couple to an energy transmitting circuit, and to generate an induced current from magnetic fields picked up by a coupling element, preferably a coil.

The term "AGV" can refer to typical AGVs such as forklifts, but also to composite systems, wherein the composite system is built up from a number of AGVs and/or functional AGV slave modules, possibly detachable (cobots, tools, machinery, industrial robots, systems designed for a number of specific functions). The parts of the composite system can furthermore be equipped with a personal battery or batteries (and/or supercaps and/or ultracaps). For a further definition, reference is made to the European patent application with application number EP16187684.2.

The recitation of numerical ranges by endpoints includes all numbers and fractions subsumed within that range, as well as the recited endpoints.

Furthermore, note that in what follows, the energy transmitting/receiving circuits and the transmitting/receiving controllers are described as separate elements. While this is true, in reality the latter will typically be built into the former. As such, it is possible that the transmitting/receiving controllers are comprised in the energy transmitting/receiving circuits, although this is not necessarily the case.

In a first aspect, the invention provides a method for wireless energy transfer from a wireless energy transfer station to an automated guided vehicle (AGV), whereby said wireless energy transfer station comprises two or more energy transmitting circuits, each preferably comprising a coil and a resonant capacitor, and whereby said AGV comprises at least one energy storage element, preferably a battery, and two or more energy receiving circuits, each preferably comprising a coil and a resonant capacitor, configured for wirelessly receiving energy from one of said energy transmitting circuits and configured for charging said at least one energy storage element with said wirelessly received energy, comprising the following steps:

a. aligning two or more of said energy receiving circuits with an equal number of said energy transmitting circuits for inductive coupling, whereby said aligning is verified by near-field communication (NF), and optionally by a second wireless communication, between the AGV and the wireless energy transfer station, optionally by transmitting coordinates of the wireless energy transfer station to the AGV and more preferably by furthermore by the AGV determining an orientation of the AGV with respect to the wireless energy transfer station;
b. inductively coupling said aligned energy transmitting circuits with said energy receiving circuits, wherein at least two of said energy transmitting circuits are inductively coupled with at least two of said energy receiving circuits in a one-on-one relation;
c. transferring energy from said inductively coupled energy transmitting circuits to said inductively coupled energy receiving circuits by inducing a current in said energy receiving circuits;
d. charging said at least one energy storage element with the transferred energy, wherein the induced current of each of said energy receiving circuits is provided in parallel with respect to each other to said at least one energy storage element.

The proposed method remedies several of prior art shortcomings. One of those is the inability to efficiently provide energy at high rates (especially in providing high currents to the energy storage element) in order to fully charge an energy storage element rapidly. Currently this can only be achieved by using exorbitantly high currents in the charging station and thereby transferring great amounts of energy. However, by using such high levels of current, not only is a dangerous situation created (both for human operators as well as for the vehicles itself, as an accident can easily damage the subtle circuitry or could start a fire in case of short-circuiting. Furthermore, high currents typically lead to high losses (due to Joule effect amongst others) and require more specialized circuitry and components both on the transmission end (charging station) and the receiving end of the vehicle to cope with the high currents and voltages. The applicant succeeds in transferring energy at high rates by parallelizing several energy transfer modules on both sides. This allows the energy transmitting circuits of the wireless energy transfer station to operate at relatively low currents and voltages, but in combination, still transferring a substantially high amount of energy in a limited time. Consequently, this will allow the energy transfer to happen under much safer conditions with substantially lower energy losses. Furthermore, the circuitry used can be much cheaper since very few elements will have to be able to deal with high currents, not only saving costs in initial purchase but also in maintenance and replacements as elements dealing with high currents will typically break down more often, and when this occurs dangerous situations can likely ensue. In addition to this, the separate energy transferring circuits may be positioned and operationally synchronized in order to form a dipole or multipole, resulting in a reduced magnetic field in the surroundings. Note that the number of energy receiving circuits can be 2, 3, 4, 5, 6, 7, 8, 9, 10, 12, 15, 20 or more. The same applies for the number of energy transmitting circuits, however, these numbers need not be equal. The energy receiving circuits are preferably furthermore adapted to rectify the induced currents before providing them to the energy storage element, and can comprise a filter and/or a rectifier.

Preferably, each of the transmitting circuits that actively participates in a power transfer, is inductively coupled with a receiving circuit and induces a current in said receiving circuit, again side current being relatively low and thus not requiring specialized components or causing undesirable losses. The currents of each of the receiving circuits in use are then provided in parallel with respect to each other, to the energy storage element. This is preferably the only part of the circuit where a high current is actually produced. By limiting the high current to this section and thus the need for higher quality components, the costs remain limited as well.

Furthermore, the proposed method provides other advantages, such as a flexible way of transferring energy depending on the configuration of the receiving circuits of the AGV. The wireless energy transfer station can couple a desired amount of transmitting circuits depending on the number of receiving circuits (and/or the physical configuration thereof) to provide an optimal energy transfer. This match in transmitting and receiving circuits can be achieved in a number of ways, for instance by recognition (IR or others) by the separate circuits that their counterpart is well enough aligned for coupling, or can be by a transmission of information concerning the number and/or physical configuration (for instance, vertical stack, horizontal stack, . . . ) of the receiving circuits to the other side (side of the charging station), thus enabling the correct transmitting circuits to be used for the power transfer. Of course any other logical way of correctly aligning a correct number of circuits on both transmitting and receiving side is possible and are to be considered as part of the scope of the application. The use of several, separate inductive couplings between transmission and receiving circuits also allows the method to overcome possible mechanical or electronical defects, as the other 'modules' can take over and still charge the energy storage elements, though perhaps at a lowered efficiency, while this would necessitate immediate reparations in prior art systems.

In a preferred embodiment, the energy transmitting circuits are each separately controlled by a transmitting controller (and thus separately provided with one). Each of these transmitting controllers is configured to be able to control step c of the method, transferring energy from the energy transmitting circuit to the energy receiving circuit. This allows the charging station to overcome possible malfunction or problems in case only one central transmitting controller is used that directs all of the separate transmitting circuits. Furthermore, it allows a more complex control and the provision of a more performant, individual operation regime of the transmitting circuits themselves to optimize the energy transfer achieved.

In a preferred embodiment, the energy receiving circuits are each separately controlled by a receiving controller (and thus separately provided with a receiving controller). This will allow the separate energy receiving circuits to be able to carry out a wireless energy transfer, should one of said circuits or a sole receiving controller (controlling the entire receiving circuit) malfunction, or not be able to correctly align with an energy transmitting circuit, or should other problems arise. By separately controlling or driving the energy receiving controllers by their own receiving controller, this problematic situation is adverted, and furthermore, each energy receiving circuit can be individually optimized as the receiving controller can calibrate the operation regime of each energy receiving circuit separately.

In a preferred embodiment, the energy transmitting circuits are driven by two half bridges.

In a preferred embodiment, each of the energy transmitting circuits of the wireless energy transfer station comprises a separate, associated transmitting controller, whereby a master energy receiving circuit is appointed among one of the energy receiving circuits for directing (driving) the transmitting controllers and a master energy transmitting circuit.

In a preferred embodiment, the wireless energy transfer station and the AGV are adapted for wireless communication, preferably via near-field communication (NF) and optionally via a second wireless communication bus, said method further comprising the following steps:
 a. establishing a data connection via NF between the wireless energy transfer station and the AGV;
 b. exchanging AGV information from the AGV to the wireless energy transfer station, at least comprising the number of energy receiving circuits (in the AGV, or intended to be used in the AGV for the power transfer);
 c. inductively coupling a number of energy transferring circuits with said energy receiving circuits, wherein said number of energy transferring circuits are inductively coupled with the energy receiving circuits in a one-on-one relation;
 d. transferring energy from said inductively coupled energy transmitting circuits to said inductively coupled energy receiving circuits by inducing a current in said energy receiving circuits;
whereby a number of energy transmitting circuits are inductively coupled for transferring energy to the inductively coupled energy receiving circuits, said number being determined based on the AGV information, preferably whereby the AGV information comprises a configuration of the receiving circuits and whereby the energy transmitting circuits to be inductively coupled for energy transfer to the energy receiving circuits are designated in view of said configuration of the receiving circuits.

A preferred embodiment is illustrated in FIG. 18. Herein:
 Each RX module (also referred to as energy receiving circuit) (100) on the AGV (106) has a circuit (101) that generates a magnetic near field (NF) (102).
 Each TX module (also referred to as energy transmitting circuit) (103) on the charging station (105) has a magnetic near field receiver circuit (104).
 Each RX module (100) on the AGV (106) has a wireless communication circuit (107), e.g. Bluetooth.
 Each TX module (103) on the charging station (105) has a wireless communication circuit (107), e.g. Bluetooth.
 Upon arrival of an AGV to the charging station, the AGV sends a NF signal trough (101) to the charging station (105). This signal can optionally contain data information with the identifier of the AGV, with the address of the wireless communication device or a serial number as per examples.
 When the charging station has received such information, its wireless communication circuit (104) will make communication link to the wireless communication circuit (104) of the AGV.
 Each 'aligned module pair RX and TX' tries to make connection, by first sending the NF information from AGV to Charger station and consequently make a wireless connection.
 In case two of more paired modules have a proper connection through above procedure, the RX circuits can exchange the communicated information through there interconnection bus, e.g. a CAN bus. In this way, a system with two or more paired modules can continue operation with one wireless link only.

The wireless link can also be a gateway for information receiving from the AGV customer interface (e.g. CAN) towards the charger stations' customer interface. This brings a free of charge (surplus) functionality available for to the customer.

Each paired module exchanges independently energy from the charger circuit to the AGV receiver circuit. This exchange of energy is controlled by a controller (109, 109b) in each of the charger station transmitting circuits and AGV receiving circuits.

It is possible for a customer to manually choose a master circuit (receiving and/or transmitting) on the AGV side and/or on the charging station side which controls the energy transfer between charging station and AGV. Alternatively, these are automatically chosen. Typically, the AGV will communicate a desired voltage setpoint and/or current setpoint (or power setpoint) to the charging station. This instruction is then divided by the master transmitting circuit over one or more of the energy transmitting circuits according to maximal power and/or current output per transmitting circuit. For instance, if an AGV with 3 receiving circuits requires a power supply of 250 W from a charging station with 5 transmitting circuits, a master transmitting circuit was appointed, which then divides the to be provided required power supply over 3 transmitting circuits of the charging station (evenly or not, depending on specific characteristics of the circuits—possibly as the circuits are configured for different power/current outputs to better suit variations in AGV power/current requirements for charging), which couple with 3 of the receiving circuits of the AGV. This is in practice accomplished by the master transmitting circuit controlling the operating current and voltage for each of the transmitting circuits that are used in the energy transfer.

Each (two or more) aligned module pair(s) (charging station side transmitting circuit+AGV side receiving circuit) will individually work based on their own current setpoint, which is preferably set by a master circuit on one or both sides of the power transfer.

As mentioned, one of the circuits in the charging station preferably operates as a master circuit and one of the circuits in the AGV can operate as a master circuit. The master circuit in the charging station has the responsibility to split the e.g. current setpoint for the charging operation between the different paired modules.

In case during the charging process or outside the charging process, one charging station transmitting circuit fails, another transmitting circuit automatically takes over the function of master so that the charging can continue at possibly lower current.

In case an output current setpoint is not used, but a battery charging current profile is used, the master can take care of organizing the other slave modules.

At the charging station side, a master transmitting circuit and/or at the AGV receiver side, a master receiving circuit is appointed. This is possible since the energy transmitting controllers, which direct the transmitting circuits are linked by one or more communication interfaces. Alternatively or additionally, same applies to the energy receiving circuits and receiving controllers.

The applicant has noted that the use of near-field communication is ideally suited for the purpose of communication between the charging station and the AGV. Other types of communication typically rely on optical connections, but optical connections can easily be disrupted or blocked. They are for instance very sensitive to dirt or dust that could block optical gates and thus disable connection. Since dust and dirt are very relevant in industrial conditions, such as in warehouses, factories and others, this is a very real problem. NF however does not need a direct visual line to communicate, and can be used even when the charging station is operational (and strong electromagnetic fields are present which could disrupt other conventional communication techniques), and furthermore allows bidirectional information exchange. Of course, alternatives are possible such as WiFi or others. The information to be exchanged can furthermore comprise a state of charge of the energy storage element, a desired (or required) output current setpoint (and/or power and/or voltage) and others. Communication may or may not continue during charging, for instance to indicate when the desired (required) current is not achieved on the receiving side so adjustments can be made on the side of the charging station (for instance more or less current, higher voltages, adjustment in alignment of AGV to charging station, load adjustments, . . . ). Due to the bidirectional nature of the information exchange, the charging station can also (repeatedly or periodically) supply to the AGV instructions to improve alignment (for instance changing distance and/or orientation of AGV with respect to the charging station) in order to optimize the coupling.

Typically, a multitude or fleet of electric vehicles or AGVs are present in most situations (for instance factory work floor), and need to be controlled carefully in order to optimize charging (for instance through preventive charging of some vehicles to avoid conflict of too many vehicles needing charging at one point in time). These can be controlled from a central point, which assigns tasks to the separate vehicles and can obtain exact positions and orientations of the vehicles (with for instance individual digital addresses). This could allow the central point to also direct charging and specifically correct alignment of the vehicle, thereby ensuring correct alignment of (a part of) the energy receiving circuits with respect to (a part of) the energy transmitting circuits. Hereby it is implicitly assumed that the energy transferring and receiving circuits each have some kind of a coupling element, for instance a coil, that is used for (aligning and) inductively coupling with each other, and through which coupling energy is transferred. When suggesting that the energy receiving and/or transferring circuits can be displaced, this can of course mean that the coupling element is displaced as this is to be aligned for coupling, while the rest of the circuit can remain substantially in the same place. Most preferably, the energy transferring circuits (or parts thereof) are displaced, as this will reduce the necessity to enable such displacements on the AGV side and only requires this option in the charging station. While this can be controlled from the central point, the applicant notes that this can be augmented by further communication between the charging station and the vehicle or AGV, for instance through NF or a sensor that can detect sufficient alignment (which can in turn be provided back to the central point in order to adjust the position and/or orientation of the AGV).

In a preferred embodiment, the AGV comprises at least one rectifier and at least one dump load, preferably whereby each of the individual energy receiving circuits comprise at least one rectifier and at least one dump load, and the method further comprises the following steps:

a. capturing and rectifying the induced currents of the energy transmitting circuits with said at least one rectifier, and providing the rectified currents to the energy storage element;

b. limiting an output voltage on the energy receiving circuits by the at least one dump load in case of disconnection of the energy storage element and/or in case of detection of an overvoltage on the energy receiving circuits.

By employing the abovementioned topology for manipulating the induced current, it is guaranteed that a desirable current is provided to the energy storage element under safe conditions, while only using relatively low current components which are less expensive and typically physically more robust (which can be convenient in industrial settings). Optionally, a filter can be provided to further adjust the rectified current before providing it to the energy storage element.

In a preferred embodiment, the energy transferring circuits are configured to employ hard switching in certain operation points. The circuits can comprise silicon carbide power components and/or gallium nitride power components or others to reduce losses when operating under a hard switching pattern. Alternatively, the energy transferring circuits can be configured to be able to operate both under hard switching and under soft switching.

In a preferred embodiment, the energy receiving circuits generate an output voltage that is placed over the energy storage element, whereby said output voltage is substantially equal to the normal voltage of the energy storage element plus the voltage drop over possible circuitry and cablings the energy storage element is possibly incorporated in. Preferably, the output voltage in case of a so-called load dump (which may cause problems such as voltage spikes and damage to components) is limited by providing dump circuitry (for instance a resistor, varistor, TVS diodes, or others) to the energy receiving circuits (can be provided separately or for several of said energy receiving circuits). Said dump circuitry is designed to reduce or limit a voltage spike in case of a sudden disconnection (from the energy storage element). When the dump circuitry is activated (to be understood as that the output voltage is substantially placed over the dump circuitry (such as when the energy storage element is disconnected), a communication is done to the charging station (or to the energy transferring circuits) to stop the power transfer. Preferably, the dump circuitry is configured to withstand the output voltage during a short time (and to be able to dissipate the power from the energy receiving circuit or circuits), which short time is the time between detection of the load dump until the power transfer is stopped. Alternatively, there may be several dump circuitries present (for instance one for each energy receiving circuit), and a number of dumps is activated (for instance sequentially) accordingly as the power transfer necessitates. This may be accomplished by initially using a single dump circuitry. Should it be unable to dissipate all of the power generated by the energy receiving circuits, the output voltage will rise and a second dump circuitry can be used, doubling power dissipation possibilities, and so on.

In a second aspect, the invention provides a wireless energy transfer station for wireless energy transfer from the wireless energy transfer station to automated guided vehicles (AGVs), whereby said AGVs comprise one or more energy storage elements and two or more energy receiving circuits, preferably comprising a coil and a resonant capacitor, configured for receiving energy through wireless energy transfer and configured for charging said energy storage element with said received energy, whereby the wireless energy transfer station comprises:

a. two or more energy transmitting circuits, preferably comprising a coil and a resonant capacitor, said energy transmitting circuits being configured for inductively coupling with one of the energy receiving circuits of the AGV in a one-on-one relation, and transmitting energy to said inductively coupled energy receiving circuit through wireless energy transfer, whereby said energy transmitting circuits are set-up in a physical configuration with respect to each other to match a physical configuration of the energy receiving circuits of the AGV; and b. two or more transmitting controllers, each associated to one of the transmitting circuits, configured to determine at least the number of energy receiving circuits comprised in the AGV, and each adapted to control the associated energy transmitting circuit;

whereby the associated transmitting controllers are each configured to individually (separately) drive the associated one or more energy transmitting circuits which are inductively coupled, for generating currents through the energy transmitting circuit, which currents are adapted to induce a time-varying electromagnetic field which generates the induced currents in the energy receiving circuits.

It is to be considered that the transmitting controllers will typically be built into or onto the energy transmitting circuit it is associated to (amongst others, to drive it more efficiently), so a transmitting controller is provided with each energy transmitting circuit. Furthermore, only energy transmitting circuits with a functioning transmitting controller will be allowed to inductively couple to an energy receiving circuit. A similar provision preferably applies to the energy receiving circuits and the receiving controllers.

Preferably, the energy transmitting circuits are modular and can be removed from or more added to the wireless energy transfer station in order to satisfy requirements in output current. It is presumed that the energy transmitting circuits can be placed in such a way that they align with standard configurations of the energy receiving circuits on the AGV (for instance, distances between the separate energy receiving circuits). Alternatively, the wireless energy transfer station can displace (part of) the energy transmitting circuits (automatically) to better align with (part of) the energy receiving circuits. Again, the previous assertions apply concerning the specific structure of the circuits and that typically a certain part on each side will need to be aligned with respect to each other.

Furthermore, many of the modifications proposed when discussing the method have also discussed structural changes, and as such said changes and modifications can be implemented to the wireless energy transfer station even if not explicitly discussed in what follows.

The proposed charging station (or wireless energy transfer station) is ideally suited for executing the method of wireless energy transfer discussed in this document. Due to the incorporation of several 'parallelized' energy transferring circuits (typically comprising a coil for inductive coupling with a coil of the energy receiving circuit of the electric vehicle). As mentioned, in this way, a high current can be induced through energy storage element of the electric vehicle or AGV to achieve very fast charging, while only generating such a high current at the energy storage element, thereby saving costs and space (as components for conducting high currents typically require more safeguards and such).

Typically, the charging station will comprise a plurality (2, 3, 4, 5, 6, 7, 8, 9, 10, 12, 15, 20 or more) of energy transmitting circuits. Preferably, the charging station can be designed to enable charging of several AGVs at once, for instance by having a plurality of energy transmitting circuits on a front side of the charging station, as well as on another side (back side for instance) of the charging station (and optionally on more sides), said sets of energy transmitting circuits being able to be controlled independently from each other, thereby allowing charging of two (or more) AGVs at once. By providing a plurality of energy transmitting circuits, the charging station can be adapted to couple with a wide variety of AGVs which can each have particular configurations of energy receiving circuits (number as well as physical configuration). As mentioned before, the energy transmitting circuits (or parts thereof, especially the coupling elements, preferably a coil) can be displaced with respect to the charging station to better align with the energy receiving circuit (or part thereof, the coupling elements and again preferably a coil), and thereby achieve a more efficient power transfer.

In a preferred embodiment of the invention, the transmitting controllers are adapted to, based on feedback it may receive from the AGV which is being charged, to adjust power provided to separate energy transmitting circuits in order to better attune the currents and voltages that are induced in the energy receiving circuits on each other, thereby creating a more stable charging current for the energy storage element. As mentioned, the feedback between charging station and AGV may happen through NF, but of course other options exist such as WiFi, and/or possibly through a central control point.

In a preferred embodiment, the energy transferring circuits are provided with power via three-phase electric power supply, or alternatively via two-phase electric power supply, or can further alternatively be fed via DC electric power supply, preferably through a pluggable connector.

In a preferred embodiment, at least one, preferably each of the transmitting controllers is configured to drive the energy transmitting circuits via two half bridges per transmitting controller.

In a preferred embodiment, the transmitting controllers are configured to drive the inductively coupled energy transmitting circuits at different frequencies. By operating the energy transmitting circuits on different frequencies, this allows an entirely independent operation of the energy transmitting circuits with respect to each other, and would prevent the malfunctioning of one of the energy transmitting circuits to affect the others. Furthermore, the different frequencies will provide a more equalized total output voltage provided by the energy transmitting circuits.

In a preferred embodiment, the wireless energy transfer station is configured for wireless communication from (and/or to) an AGV via a communications link, preferably via near-field communication (NF) and optionally a second wireless communication, and acquiring AGV information comprising the number of operational energy receiving circuits on the AGV, and whereby the transmitting controllers are configured to determine based on the AGV information which of the energy transmitting circuits are used in a wireless energy transfer to the AGV. As mentioned, NF is an ideal communication method for the application of this technology in industrial settings, where dirt and dust may hinder other communications. The use of AGV information, particularly the number of (operational) energy receiving circuits of the AGV, allows the charging station (transmitting controller) to control the energy transmitting circuits in order to preferably couple an energy transmitting circuit to each available (operational) energy receiving circuit (which would come down to providing power to the energy transmitting circuit for inductive power transfer to the energy receiving circuit).

In a third aspect, the invention provides a wireless energy receiving system for charging at least one storage element, preferably a battery, of an AGV, whereby said wireless energy charging system is comprised in the AGV and electrically connected to said at least one energy storage element, the wireless energy receiving system comprising:

a. two or more energy receiving circuits, preferably comprising a coil and a resonant capacitor, each configured inductively coupling with an energy transmitting circuit, preferably comprising a coil and a resonant capacitor, of a wireless energy transfer station in a one-on-one relation, and configured for receiving energy through wireless energy transfer from said inductively coupled energy transmitting circuit whereby a current is induced in the energy receiving circuit, and furthermore configured to charge said at least one energy storage element by providing the induced current of each of said energy receiving circuit in parallel to said at least one energy storage element;

b. and preferably two or more receiving controllers, each associated to one of the energy receiving circuits, each configured to control the energy receiving circuits.

The system described above can be provided to one or more AGVs, of a fleet for instance, which then can charge in a wireless energy transfer station as described in this document, and/or according to the method discussed in the document. The advantages of the abovementioned charging station and wireless energy transfer method are thus clearly applicable to the wireless energy receiving system as well. As mentioned, by providing separate receiving controllers each assigned to one of the energy receiving circuits, the possible malfunctioning of a sole controller is averted, or in case of impossible linkup, or should other problems arise.

In a preferred embodiment, the wireless energy receiving system comprises means for communicating with a wireless energy transfer station. Preferably said means are configured for connecting a controller unit (for instance an ECU or a battery management system (BMS) of the AGV) of the AGV to said wireless energy transfer station. This allows for the communication of information relevant to the energy transfer, for instance, the number of energy receiving circuits (operational) comprised in the wireless energy receiving system, the physical configuration thereof, other parameters, for instance desired output current, desired output voltage. Furthermore, feedback can be sent during the energy transfer, for instance feedback indications whether or not a desired output current is achieved (and possibly the difference between actual and desired output current), or a desired output voltage (again, possibly with the difference between actual and desired output voltage), which the wireless energy transfer station can then use to adjust its operational parameters (ranging from frequency, switching patterns, voltages, currents, distance and/or orientation of AGV to charging station and others).

In a preferred embodiment, the energy receiving circuits comprise a rectifier (each or separately) and optionally one or more filters and/or dump circuit (again, each or separately). The rectified currents are then provided to the energy storage element to charge this. There is no further DC-DC conversion, thus allowing for a limited size of the energy receiving circuits, and thus of the system. Preferably, a rectifier (and optional filters and/or optional dump circuit) is provided for each energy receiving circuit, as in this way, these do not need to be able to withstand high currents (and are individually cheaper), and only in a limited circuitry connected to the energy storage element, a high current needs to be conducted, which can be compactly and efficiently shielded for safety.

The invention is further described by the following non-limiting examples which further illustrate the invention, and are not intended to, nor should they be interpreted to, limit the scope of the invention.

The present invention will be now described in more details, referring to examples that are not limitative.

EXAMPLES

Example 1

Figure 13:
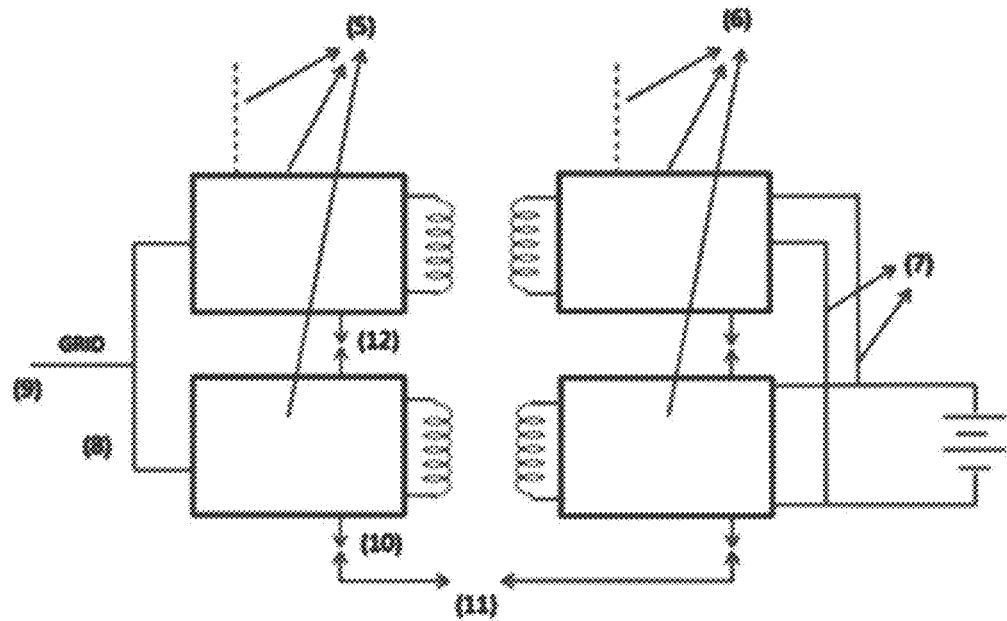
FIG. 13 shows a schematic configuration of an embodiment of a wireless energy transfer station with two energy transmitting circuits (each having a coil) aligned with two energy receiving circuits (each having a coil) and electrically connected for charging an energy storage element.

In FIG. 13, a schematic representation is shown of a wireless energy transfer station (1), which comprises two energy transmitting circuits (5a, 5b), which in turn each comprise a coupling element, a coil (60) in this case. Furthermore, a wireless energy receiving system (2) is shown, which comprises two energy receiving circuits (6a, 6b), which in turn comprise a coupling element, a coil (49) in this case, as well, and is electrically connected to an energy storage element (7). Note that the number of circuits displayed (on each side) in the example is purely random, and possible more circuits can be present at any side (transmitting and/or receiving) but these are not participating in the power transfer at hand. Reasons for the non-participation can be various, ranging from defects, bad alignment, deliberate limitation of the induced current for charging the energy storage element (7), a surplus on circuits on one side (as there is normally a one-on-one coupling), . . . . The energy transmitting circuits (5a, 5b) can each comprise a transmitting controller (which may communicate with each other wired and/or wireless (12), and is visible as element 109a in FIG. 18), said transmitting controllers being able to adapt the power provided by a power supply and determine the current and voltage provided to the coil (60). Alternatively, a single control unit can be provided between the power supply and the energy transmitting circuits (5a, 5b), and can separately control said energy transmitting circuits (5a, 5b). As can be seen in FIG. 13, the coils (60) of the energy transmitting circuits (5a, 5b) are aligned with the coils (49) of the energy receiving circuits (6a, 6b) for inductive coupling and wireless power transfer. The precise process of the inductive power transfer between the (primary) coils (60) and the (secondary) coils (49) will not be discussed in depth in this document, as this is simply the principle under which a transformer operates and should be considered as known by any expert in the field. As is known, an AC current through the coils (60) of the energy transmitting circuits (5a, 5b) will induce induced currents through the coils (49) of the energy receiving circuits (6a, 6b) (at least of those that are aligned with an energy transmitting circuit that is operational). These induced currents will then be provided to the energy storage element (7) in parallel with respect to each other, whereby the normal output voltage of the energy storage element (7) is upheld. As mentioned before, this can be ensured by adapting some parameters on the transmitting side (1) and/or on the receiving side (2). By parallelizing the multiple induced currents of the energy receiving circuits (5a, 5b), a high current can be provided to the energy storage element, but said high current is limited to only this section, which furthermore can be effectively shielded for safety reasons.

As mentioned before, the charging station (1) and the wireless energy receiving system (2) may be adapted to communicate with each other through a communication bus (10, 11). Preferably, this communication is effected through near-field communication (NF), and optionally through a second wireless communication.

Figure 14:
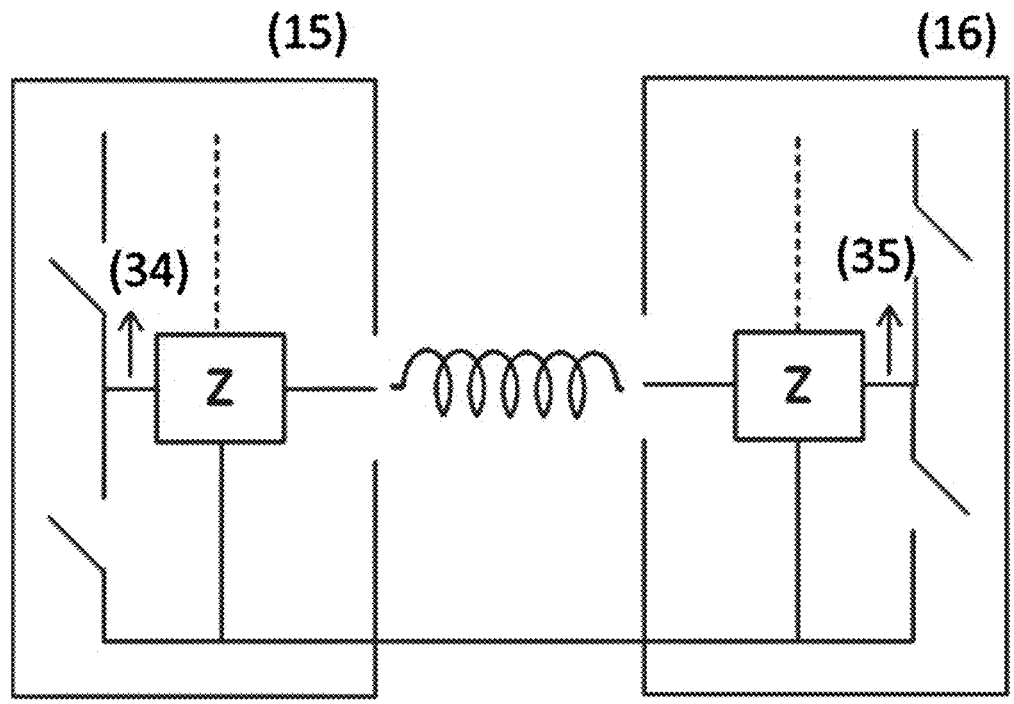
FIG. 14 shows a schematic representation of an embodiment of (part of) a wireless energy transmitting circuit.

FIG. 14 shows a schematic embodiment of part of an energy transmitting circuit where an impedance (Z) is provided on each terminal of the coil (60), and where two half bridges (15, 16) further drive the voltage and current through the coil (60).

Figure 15:
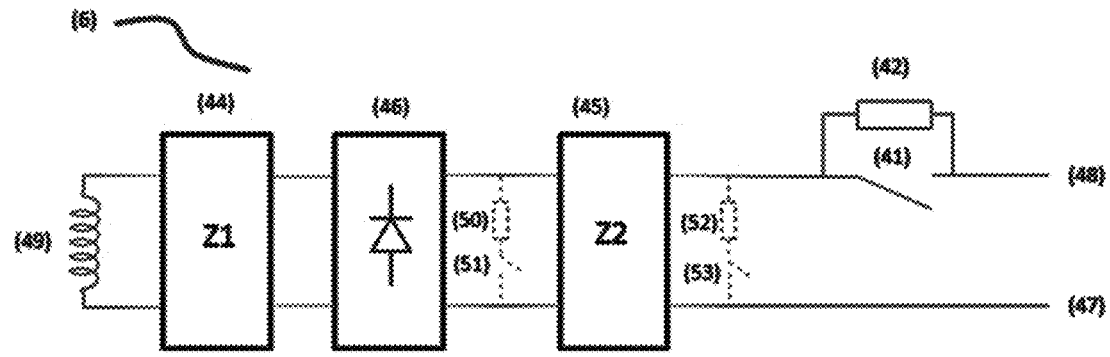
FIG. 15 shows a schematic representation of an embodiment of (part of) a wireless energy receiving circuit.
Figure 16:
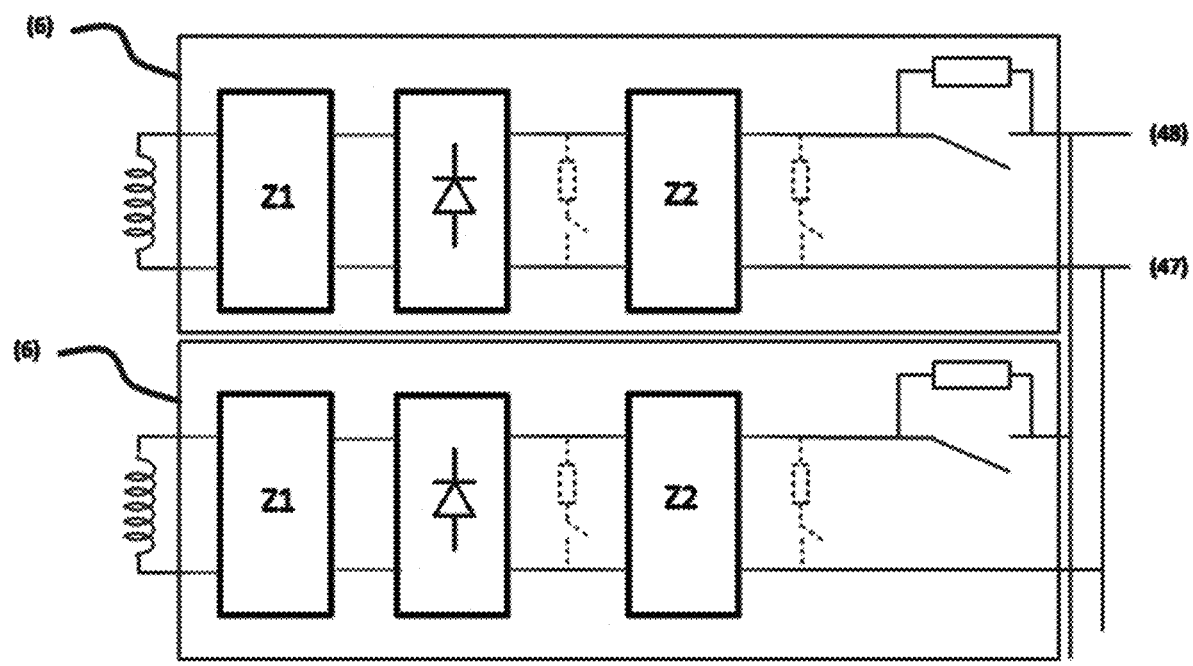
FIG. 16 shows a schematic representation of an embodiment of a wireless energy receiving system (with two energy receiving circuits), which system can be electrically connected to an energy storage element.
Figure 17:
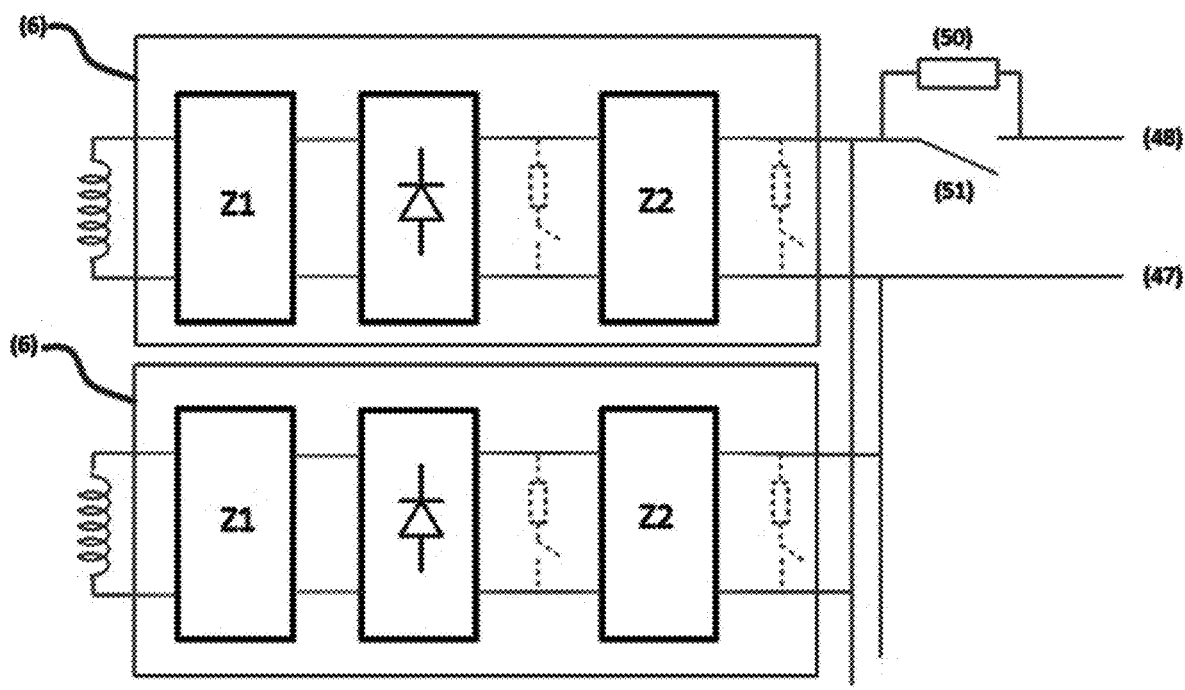
FIG. 17 shows a schematic representation of an alternate embodiment of a wireless energy receiving system (with two energy receiving circuits), which system can be electrically connected to an energy storage element.

FIGS. 15, 16, and 17 show schematic embodiments of (a substantial part of) one or more single energy receiving circuits.

FIG. 18 shows a more detailed representation of a wireless energy transfer station and energy receiving system.

The invention claimed is:

1. A wireless transmitter module and wireless receiver module where the transmitter module is a part of a charging equipment for batteries or supercapacitors and where the receiver module is another part of the charging equipment for batteries or supercapacitors;

whereby said wireless receiver module comprises a coil, a serial impedance Z1, a rectifier, an output filter Z2, and at least three protection circuits connected along a load circuit;

whereby the rectifier is connected between the serial impedance Z1 and the output filter Z2 and configured to capture and rectify the induced currents from the transmitter module inside the receiver module, and provide the rectified currents to a connected load circuit, said load circuit being a battery or supercapacitor;

whereby at least one protection circuit comprises at least one switch connected in series with the load circuit, which is configured to disconnect the load from the wireless receiver module in case of overcurrent, reverse current or other fault condition; and whereby at least one protection circuit comprises at least one dump load switch connected in parallel with the load circuit, between the rectifier and the filter, and at least one protection circuit comprises at least one dump load switch connected in parallel with the load circuit after the filter, which are configured to protect the receiver module in case of disconnection of a previously connected load circuit, said load circuit being a battery or supercapacitor, by limiting an output voltage on the energy receiving circuits by at least one of said dump load switches in case of disconnection of the energy storage element and/or in case of detection of an overvoltage on the energy receiving circuits.

2. A wireless transmitter module and wireless receiver module according to claim 1, whereby the wireless transmitter module that is connected to a grid or DC power source or current source.

3. A wireless transmitter module and wireless receiver module according to claim 1, whereby said wireless receiver module is adapted for connection to a battery or supercapacitor.

4. A wireless transmitter module and wireless receiver module according to claim 1, whereby the protection circuit acts as an overvoltage protection of the receiver module.

5. A wireless transmitter module and wireless receiver module according to claim 1, comprising a second wireless transmitter module, whereby the wireless transmitter modules are connected in parallel to a grid or DC power source to form a higher power wireless power system.

6. A wireless transmitter module and wireless receiver module according to claim 1, comprising a second wireless receiver module, whereby the wireless receiver modules are connected in parallel to a battery or supercapacitor to form a higher output power or current wireless receiver system.

7. A wireless transmitter module and wireless receiver module according to claim 1, whereby the wireless receiver module and the transmitter module each comprises a near field transmitter circuit mounted therein, which near field transmitter circuit is adapted to send information to the near field receiver in the transmitter module.

8. A wireless transmitter module and wireless receiver module according to claim 7, whereby said information comprises identification information on receiver and/or transmitter wireless module.

9. A wireless transmitter module and wireless receiver module according to claim 7, whereby said near field transmitter circuit comprises a near field transmitter coil, said coil being driven by a half bridge electronic circuit, said half bridge electronic circuit using frequency shift keying.

10. A wireless transmitter module and wireless receiver module according to claim 1, whereby the wireless transmitter module comprises a near field receiver circuit which comprises a near field receiver coil.

11. A wireless transmitter module and wireless receiver module according to the claim 1 whereby said near field receiver coil comprises a bandpass filter and comprises frequency shift keying detection electronics.

12. A wireless transmitter module and wireless receiver module according to claim 1, whereby the wireless transmitter module comprises electronics to drive a primary energy transmitter coil.

13. A wireless transmitter module and wireless receiver module according to claim 1, whereby the wireless transmitter module comprises at least 2 half bridges that form an inverter to drive the primary energy transmitter coil.

14. A wireless transmitter module and wireless receiver module according to claim 1, whereby the wireless transmitter module comprises at least 2 half bridges consisting of a total 4 electronic switches which form an inverter to drive the transmitter module coil while the inverter has a switching pattern that equalizes switching losses in both half bridges.

15. The wireless transmitter module and wireless receiver module according to claim 1, whereby the wireless receiver module is configured to send a shut-down signal to shut off the transmitter module in case of detection of an overvoltage on the receiver module.

* * * * *